US008300742B1

(12) United States Patent
Bromberg et al.

(10) Patent No.: US 8,300,742 B1
(45) Date of Patent: Oct. 30, 2012

(54) SYSTEMS AND METHODS FOR CHANNEL BASED BEAMFORMING FOR STACKED CARRIER MULTIPLE ACCESS

(76) Inventors: Matthew C. Bromberg, Leominster, MA (US); Dale Branlund, Santa Clara, CA (US); Will Sun, Boxborough, MA (US)

(*) Notice: Subject to any disclaimer, the term of this patent is extended or adjusted under 35 U.S.C. 154(b) by 864 days.

(21) Appl. No.: 12/276,261

(22) Filed: Nov. 21, 2008
(Under 37 CFR 1.47)

Related U.S. Application Data

(60) Provisional application No. 60/989,802, filed on Nov. 21, 2007.

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........................................ 375/346; 375/285
(58) Field of Classification Search .......... 375/259–260, 375/285, 346, 348; 370/206
See application file for complete search history.

(56) References Cited

U.S. PATENT DOCUMENTS

| | | | | |
|---|---|---|---|---|
| 5,982,327 A * | 11/1999 | Vook et al. | ..................... | 342/380 |
| 6,128,276 A * | 10/2000 | Agee | ............................ | 370/208 |
| 6,512,737 B1 | 1/2003 | Agee | | |
| 6,788,661 B1 * | 9/2004 | Ylitalo et al. | .................. | 370/334 |
| 8,064,532 B2 * | 11/2011 | Maltsev et al. | ................ | 375/267 |
| 2007/0280367 A1 * | 12/2007 | Nakao et al. | ................... | 375/260 |
| 2008/0089396 A1 * | 4/2008 | Zhang et al. | ................... | 375/220 |
| 2011/0317683 A1 * | 12/2011 | Branlund et al. | ............. | 370/344 |
| 2012/0033618 A1 * | 2/2012 | Wallace et al. | ............... | 370/328 |

OTHER PUBLICATIONS

Yoshii et al., Interference Mitigation with Coordinated Symbol Repetition, IEEE S802.16M-07/211, Nov. 7, 2007, pp. 1-7.
Stuckman et al., A Multidimensional Bayesian Global Search Method Which Incorporates Knowledge of an Upper Bound, University of Louisville, 1989, pp. 591-596.
Bromberg et al., The Use of Programmable DSPs in Antenna Array Processing, Oct. 2001, pp. 57-95, John Wiley & Sons, Ltd.
Golub et al., Matrix Computations, 1996, The John Hopkins University Press, Baltimore, Maryland.
Haykin, Simon, Adaptive Filter Theory, 2002, Prentice Hall, Inc., Upper Saddle River, New Jersey.
Maryak et al., Global Optimization via SPSA, 1999, The Johns Hopkins University Applied Physics Laboratory, Laurel, Maryland.

(Continued)

*Primary Examiner* — Jean B Corrielus
(74) *Attorney, Agent, or Firm* — David A. Jakopin; Pillsbury Winthrop Shaw Pittman LLP

(57) ABSTRACT

Methods and systems that enhance interference cancellation are described. Samples are obtained from stacked carriers in a received signal and a data vector is created from the samples. Stacked carriers are selected using a steering vector received during synchronization of the receiver. The steering vector is calculated to obtain cancellation of interference from another receiver and is calculated based on time domain channel estimation. Specialized time domain training sequences and simple cross correlation are used to obtain a channel estimate for use in stacked carrier beamforming and/or for use in OFDM based spatial beamforming. State space or filter based modeled interpolators in the frequency domain or time domain to interpolation of the channels, or whitening matrix-filters over time or frequency are used for maintaining linear beamforming weights as a function of time or frequency. Space time adaptive processing facilitates beamforming of communications signals OFDM and 802.16 (WiMax) systems.

30 Claims, 14 Drawing Sheets

OTHER PUBLICATIONS

Myers, Douglas G., Digital Signal Processing, Efficient Convolution and Fourier Transform Techniques, 1990, pp. 85-112, Prentice Hall of Australia Pty. Ltd.

Orfanidis, Sophocles J., Optimum Signal Processing: An Introduction, 1988, McGraw-Hill Publishing Company, New York, New York.

Thirumalai, Srikanth, High Performance Algorithms to Solve Toeplitz and Block Toeplitz Matrices, 1996, Ph.D. Thesis University of Illinois, Urbana-Champaign.

Verdu, Sergio, Multiuser Detection, 1998, Cambridge University Press, New York, New York.

\* cited by examiner

SYSTEMS AND METHODS FOR CHANNEL BASED BEAMFORMING FOR STACKED CARRIER MULTIPLE ACCESS

CROSS-REFERENCE TO RELATED APPLICATIONS

The present Application claims priority from U.S. Provisional Patent Application No. 60/989,802 filed Nov. 21, 2007, entitled "Systems and Methods for Channel Based Beamforming for Stacked Carrier Multiple Access," which is incorporated by reference herein in its entirety.

BACKGROUND OF THE INVENTION

1. Field of the Invention

The present invention relates generally to wireless communications and more particularly to systems and methods for cell-based wireless communications.

2. Description of Related Art

Many wireless systems require techniques allowing a base station to broadcast control messages to one or more users in an unsolicited fashion. The messages must often be sent in the presence of co-channel interference from other base stations. The requirement is driven in part by the increased user density and lower reuse factors enabled by interference cancellation techniques such as spatial filtering and adaptive beam-forming. These techniques are in turn enabled by modern standards such as IEEE 802.16 (WiMAX). Furthermore many of the newer standards have adopted orthogonal frequency-division multiplexing (OFDM) technology, which provide unique challenges and opportunities to equipment manufacturers.

Issues include co-channel interference (CCI) that limit performance, especially at the cell edge. For WiMAX, as the performance of the frame control header (FCH) and the media access protocol (MAP) deteriorate, so does system reliability. The only conventional approach to resolving this issue is provided in the WiMAX standard and involves increasing code repetition times and frequency reuse. However, this approach causes a large control channel overhead, and the efficiency of the control channel becomes very poor.

BRIEF SUMMARY OF THE INVENTION

In certain embodiments, systems and methods are provided that offer improvements for both traffic and control channels in wireless systems. Certain embodiments address issues associated with CCI in a manner that facilitates improvements of performance at the edges of cells. In certain embodiments, system reliability of WiMAX based systems is improved through performance enhancement in frame control header (FCH) and MAP.

According to certain aspects of the invention, a time domain preamble symbol is provided as an alternative to the conventional frequency domain preamble sequence. The use of a time domain preamble can increase channel estimation performance, facilitating cancellation of co-channel interference. MAP performance can also be improved significantly without increasing the overhead.

DETAILED DESCRIPTION OF THE INVENTION

Figure 1:
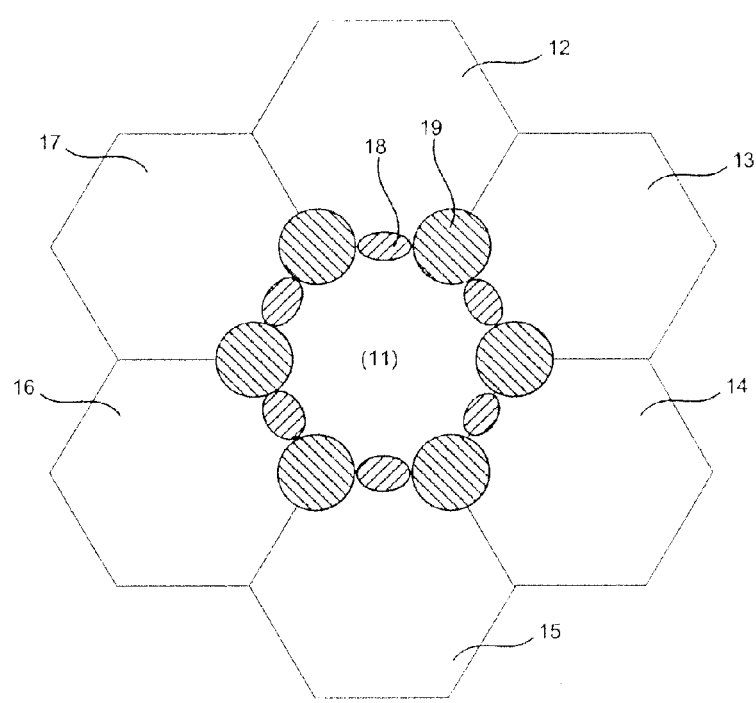
FIG. 1 shows a cell structure exhibiting co-channel interference.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Although many of the techniques described herein assume the use of OFDM, but the invention is not limited to OFDM. For the purposes of this description, it is assumed that a broadcast channel can or must be transmitted over several narrow band channels, wherein a narrow band antenna assumption readily applies. However, the techniques described are not limited to broadcast channels, but can readily be applied to traffic channels as well.

The narrow band antenna assumption for the received signal at the subscriber unit can be written as:

$$x_k(n) = \sum_{q=1}^{Q} a_{qk} d_{qk}(n) + i_k(n),$$

where $x_k(n)$ is the M×1 received complex data vector at sample index n and channel number k, $a_{qk}$ is the M×1 steering vector for source emitter q, frequency channel k, $d_{qk}(n)$ is the transmitted information symbol for emitter q, channel number k and sample index n, $i_k(n)$ is the interference vector seen on channel k and M is the number of antennas available to the receiver.

The n index may itself be due to additional frequency subcarriers or due to channel reuses over time. It may be assumed that, in the former case, the frequency subcarriers are closely enough spaced so that the channel can be considered constant. Thus the carrier spacing as indexed by k should be greater than any frequency diversity introduced by n.

Certain embodiments of the invention yield improvements in both control and traffic channels. Certain embodiments address issues associated with co-channel interference (CCI) that limit performance, especially at the cell edge. For the purposes of this description the example of IEEE 802.16e (WiMAX) media access protocol (MAP) will be used. For WiMAX, as the performance of the frame control header (FCH) and the media access protocol (MAP) deteriorate, so does system reliability. The current WiMAX standard provides no options for resolving this issue other than increasing the code repetition times and frequency reuse which can cause a large control channel overhead and significant degradation in control channel efficiency.

To permit multiple access for the broadcast channel the transmitters may be constrained such that a type of repetition code may be employed over the channel index. This is convenient because for example the 802.16 standard specifies the use of a repetition code for the downlink map. However, the use of the code according to certain aspects of the invention permits greatly improved performance in the presence of multiple co-channel emitter base stations. The repetition code, concept, referred to herein as stacked carrier, permits the receiver model to take the form of:

$$x(n) = \sum_{q=1}^{Q} a_q d_q(n) + i(n), \quad \text{(eq. 1)}$$

$$a_q \equiv \begin{Bmatrix} a_{q1} g_1 \\ a_{q2} g_2 \\ \vdots \\ a_{qK} g_K \end{Bmatrix} \quad \text{(eq. 2)}$$

$$i(n) \equiv \begin{Bmatrix} i_1(n) \\ i_2(n) \\ \vdots \\ i_K(n) \end{Bmatrix}$$

where a repetition spreading code given by $g=(g_1, g_2, \ldots g_K)^T$ is employed and where it is assumed that the same information symbol is used for all k, $d_{qk}(n)=g_k d_q(n)$. Although the logical carrier indices are numbered consecutively from 1 to K in Equation 2, the actual set of spread frequencies to which they map can be completely arbitrary. However the n indices imply a reuse of the same channel for reception of additional information symbols.

The stacked carrier concept allows for the cancellation of co-channel interferers greatly enhancing the performance over more traditional schemes such as diversity combining or maximum ratio combining. Moreover stacked carrier interference cancellation can be employed with minimal or no changes to the current WIMAX standard. Interference cancellation can be achieved in much the same way that interference cancellation is obtained in linear beam-forming, by placing nulls in the signal subspaces formed by the interfering emitters spreading codes multiplied by the wireless channel.

Figure 8:
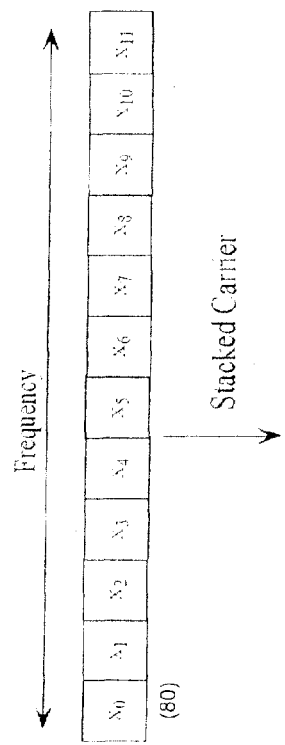
FIG. 8 illustrates operation of a stacked carrier system.
Figure 9:
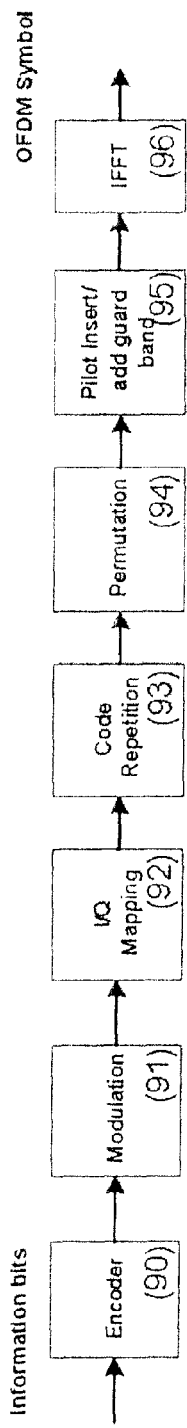
FIG. 9 shows an example of a process for OFDM symbol generation.
Figure 10:
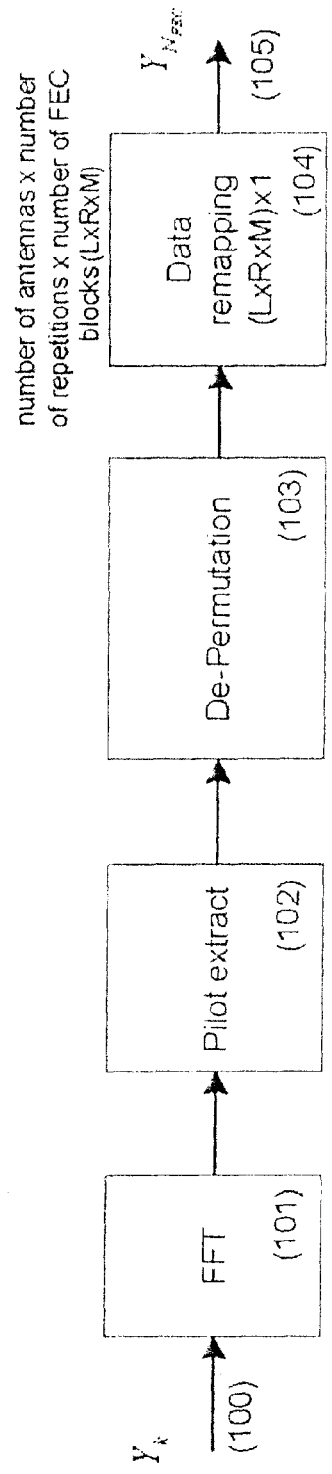
FIG. 10 shows an example of a process for processing received signals.

FIG. 8 illustrates a stacked carrier concept according to certain aspects of the invention from a receiver perspective. A set of subcarriers 80 is gathered at the receiver. Typically, in stacked carrier based systems, received data vectors can be created by sampling a vector from widely separated frequencies. The vectors form the columns depicted at 82. These vectors can be treated in a manner similar to data received from multiple antennas. It should be noted that, although the subcarriers are depicted here with constant interleaving, subcarriers may be chosen from an arbitrary set of frequency bins.

At the receiver it can be assumed that knowledge of the channel information is in the form of the steering vectors $a_q$, although this knowledge may be uncertain and is typically obtained from synchronization/training sequences transmitted separately. In this regard, channel estimation procedures that can be obtained either in the time or frequency domains, depending on the channel model employed, will be described.

Receiver Processing

An optimum receiver can be derived by conditioning on the assumption of known steering vectors $a_q$ and then using an assumption that the transmitted symbols and the interference are Gaussian white noise. The statistics of $a_q$, may then be considered as well as the possibility of non-white but unknown interference and then the possibility of more severe constraints on $d_q(n)$, which leads to the deployment of multi-user detection (MUD).

The receiver can be written in the further compressed form:

$$x(n)=Ad(n)+i(n), \quad \text{(eq. 3)}$$

$$A \equiv (a_1, a_2, \ldots a_Q)$$

$$d(n) \equiv (d_1(n), d_2(n), \ldots d_Q(n))^T \quad \text{(eq. 4)}$$

Thus, using Bromberg notation and assuming that the interference is complex Gaussian, $i(n) \sim CN_1^{MK}(0, R_{ii})$ and that the information symbols are complex, unit variance, Gaussian white noise, $d(n) \sim CN_1^Q(0, I)$. From this it should be readily apparent that $x(n) \sim CN_1^{MK}(0, AA^H + R_{ii})$ so that, $$p_x(x|A) = \pi^{-MK}|AA^H + R_{ii}|^{-1} etr(-x^H(AA^H + R_{ii})^{-1}x).$$

In certain embodiments, the conditional probability can be computed as $p_d(d(n)|x(n), A)$, from which the optimal least squares estimator for $d(n)$ can be found. Typically, this quantity can be computed from:

$$p(d \mid x) = \frac{p(x \mid d)p(d)}{p(x)} = \qquad \text{(eq. 5)}$$

$$\frac{\pi^{-MK}|R_{ii}|^{-1}etr(-R_{ii}^{-1}(x-Ad)(x-Ad)^H)\pi^{-Q}etr(dd^H)}{\pi^{-MK}|AA^H+R_{ii}|^{-1}etr(-x^H(AA^H+R_{ii})^{-1}x)} =$$

$$\pi^{-Q}|A^H R_{ii}^{-1} A + I|\exp\left(-(d-\bar{d})^H(A^H R_{ii}^{-1} A + I)(d-\bar{d})\right)\bar{d} \equiv$$

$$(A^H R_{ii}^{-1} A + I)^{-1} A^H R_{ii}^{-1} x,$$

where, $etr(X) \equiv \exp(Tr(X))$. Therefore, $$d(n)|x(n) \sim CN_1^Q(w_0^H x(n), (A^H R_{ii}^{-1} A + I)^{-1})$$

$$w_0 = R_{ii}^{-1} A (I + A^H R_{ii}^{-1} A)^{-1}$$

and thus the optimal expected least squares estimator is given by, $$E(d(n)|x(n)) = w_0^H x(n).$$

This can also be written as:

$$w_0 = R_{xx}^{-1} A$$

$$R_{xx} = R_{ii} + AA^H. \qquad \text{(eq. 6)}$$

It should be apparent that the estimate is independent and identically distributed over the sample index n. Note that it is possible to incorporate uncertainty in the estimation of A by assuming a tractable noise model for the distribution of A and integrating A out of the estimator in Equation 5.

Co-Channel Interference Cancellation (CCIC)

Figure 2:
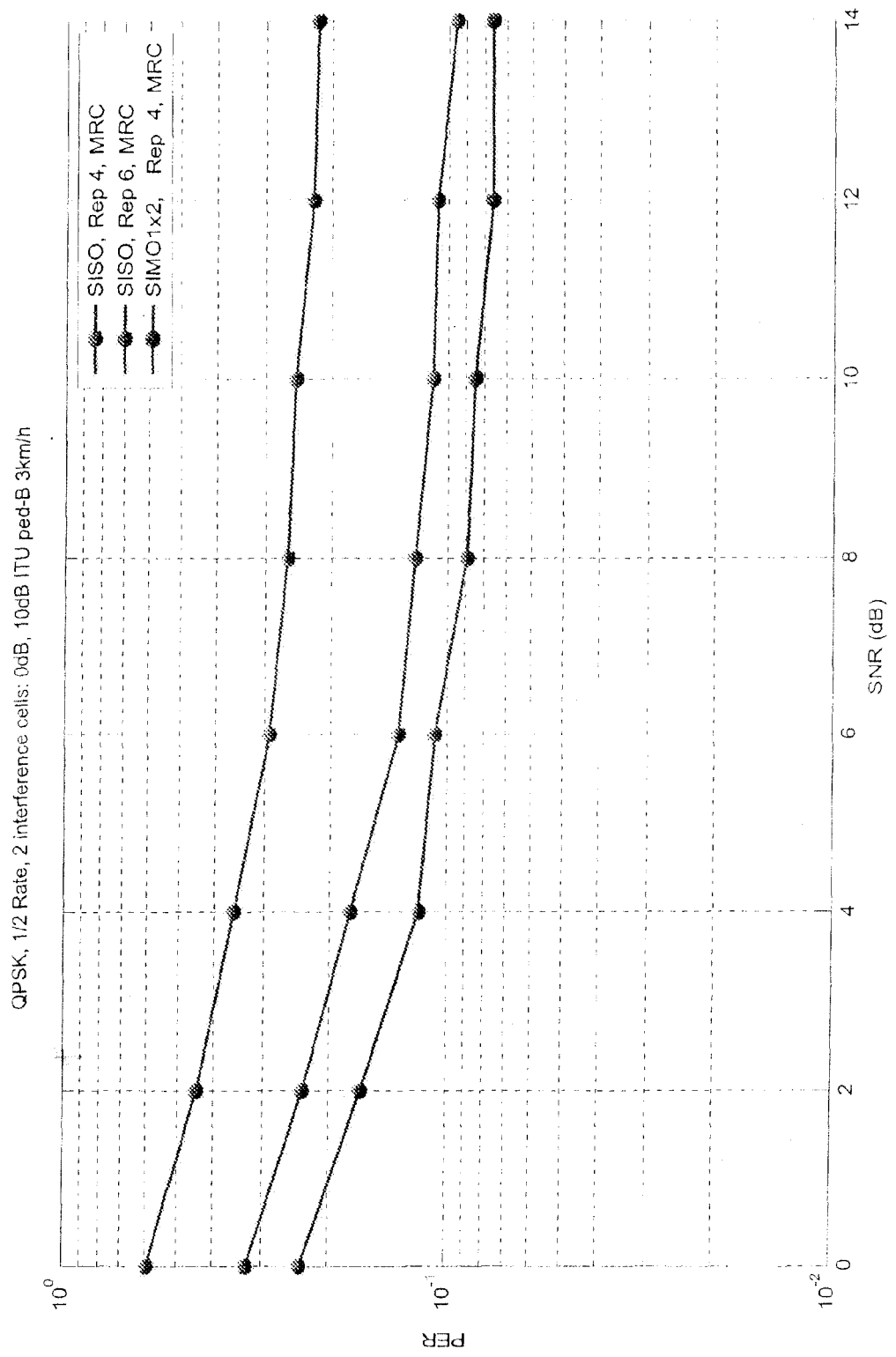
FIG. 2 is a graph illustrating maximum ration combining (MRC) performance in a two interference cell example.

Code repetition and maximum ratio combining code repetition approach is used in WiMAX to enhance decoding performance. Maximum ratio combining (MRC) is used at a receiver to combine these repeated codes and improve the packet error rate (PER) or bit error rate (BER). MRC is an optimal combining method when the interferences comprise additive white Gaussian noise (AWGN). However, at a cell edge, co-channel interference (CCIs) is generally very strong and cannot be characterized as AWGN. In this case, MRC performance becomes very poor and PER may fall below acceptable thresholds. FIG. 1 shows an example of cell deployment configuration which includes a target cell 11 surrounded by neighboring cells 12-17. At cell edge 18 (for example), the Signal to Interference Ratio (SIR) can fall below 0 dB or worse. For example, in a system where (i) neighboring cells 12-17 are interference cells, (ii) frequency reuse is 1/3/1 and (iii) loading is 100%, a worst case measurement at the center of influence of three cells at circle 19 (for example), the SIR may be approximately −8.9 dB. FIG. 2 shows MRC performance at cell edge for a simulation of two interference cells where SIR is set for 0 dB and 10 dB for the cells. It is apparent that the MRC can not reach the required 1% PER at cell edge. Although frequency reuse 1/3/3 can improve the cell edge performance, it carries the disadvantage of poor MAP efficiency. For example, in the case of frequency reuse 1/3/3 with code repetition 4, the MAP efficiency is only about 8%. Thus, the MRC approach can exhibit poor performance at cell edge.

Co-Channel Interference Cancellation by using Code Repetition

Certain embodiments employ CCIC methods to improve cell edge performance without losing MAP efficiency. Assuming that the data block $S_i^k$ is repeated N times as $$X_i^k = [S_i^k \; S_{i+M}^k \; S_{i+2M}^k \ldots S_{i+(N-1)M}^k]^T, \qquad \text{(eq. 7)}$$

where $S^{ik}$ is a coded and modulated data block with the block size M, $S_i^k = S_{i+j}^k$. i and i+j are the logical subcarrier indexes of the data block $S_{i+j}^k$, j=0, M, . . . (N−1)M and k is the index of the cells. After PUSC permutation, the logical subcarriers can be mapped to physical subcarriers as:

$$X_{i_{PUSC}} = f_{PUSC}(X_i^k), \qquad \text{(eq. 8)}$$

where $f_{PUSC}(\;)$ means PUSC permutation function and $i_{PUSC}$ is the index of the physical subcarriers. The received signal can be expressed as:

$$Z_{i_{PUSC}}^l = \sum_{k=1}^{K} \Psi_{i_{PUSC}}^{lk} X_{i_{PUSC}}^k + N_{i_{PUSC}}^l, \qquad \text{(eq. 9)}$$

where l is antenna index at receiver, $\Psi_{i_{PUSC}}^{lk}$ is frequency domain channel transfer function from the k-th cell to l-th antenna at the receiver, $N_{i_{PUSC}}^l$ is an AWGN.

Assuming now that all the neighboring cells use the same data block size and code repetition numbers, and $\Psi_{i_{PUSC}}^{lk}$ can be estimated from the preamble symbols and expressed as $\hat{\Psi}_{i_{PUSC}}^{lk}$, k=1, 2, . . . K. Then, both received signal $Z_{i_{PUSC}}^l$ and estimated channels $\hat{H}_{i_{PUSC}}^{lk}$ are de-permutated:

$$Z_i^l = f_{DE-PUSC}(Z_{i_{PUSC}}^l) \qquad \text{(eq. 10)}$$

$$\hat{\Psi}_i^{lk} = f_{DE-PUSC}(\hat{\Psi}_{i_{PUSC}}^{lk}), \qquad \text{(eq. 11)}$$

where $f_{DE-PUSC}(\;)$ is the de-permutation function. The estimated channels play the same role as the steering vectors in (eq. 3). Thus:

$$Z_i^l = [Y_i^l \; Y_{i+M}^l \ldots Y_{i+(N-1)M}^l]^T \qquad \text{(eq. 12)}$$

$$\hat{\Psi}_i^{lk} = [\hat{H}_i^{lk} \; \hat{H}_{i+M}^{lk} \ldots \hat{H}_{i+(N-1)M}^{lk}]^T \qquad \text{(eq. 13)}$$

and, analogous to (eq. 3), $$\begin{bmatrix} Y_i^l \\ Y_{i+M}^l \\ \vdots \\ Y_{i+(N-1)M}^l \end{bmatrix} = \qquad \text{(eq. 14)}$$

$$\begin{bmatrix} \hat{H}_i^{l1} & \hat{H}_i^{l2} & \ldots & \hat{H}_i^{lK} \\ \hat{H}_{i+M}^{l1} & \hat{H}_{i+M}^{l2} & \ldots & \hat{H}_{i+M}^{lK} \\ \vdots & & \ldots & \\ \hat{H}_{i+(N-1)M}^{l1} & \hat{H}_{i+(N-1)M}^{l2} & \ldots & \hat{H}_{i+(N-1)M}^{lK} \end{bmatrix}^l \begin{bmatrix} S_i^1 \\ S_i^2 \\ \vdots \\ S_i^K \end{bmatrix} + N_i^l$$

If M≧K, $S_i^k$ can be estimated according to the different criteria; for example, if it is assumed that $R_{N_i}^l$ is the correlation matrix of the additive noise which is assumed to be AWGN and known, an MMSE estimate of $S_i^k$ can be obtained as:

$$\begin{bmatrix} \hat{S}_i^1 \\ \hat{S}_i^2 \\ \vdots \\ \hat{S}_i^K \end{bmatrix} = W_K \begin{bmatrix} Y_i^l \\ Y_{i+M}^l \\ \vdots \\ Y_{i+(N-1)M}^l \end{bmatrix} \quad \text{(eq. 15)}$$

and Equation 6 can be rewritten:

$$W_K = (R_{N_i}^l + \hat{H}_i^{lK^T} H_i^{lK})^{-1} H_i^{lK^T} \quad \text{(eq. 16)}$$

where $$\hat{H}_i^{lK} = \begin{bmatrix} \hat{H}_i^{l1} & \hat{H}_i^{l2} & \ldots & \hat{H}_i^{lK} \\ \hat{H}_{i+M}^{l1} & \hat{H}_{i+M}^{l2} & \ldots & \hat{H}_{i+M}^{lK} \\ \vdots & \ldots & \ldots & \\ \hat{H}_{i+(N-1)M}^{l1} & \hat{H}_{i+(N-1)M}^{l2} & \ldots & \hat{H}_{i+(N-1)M}^{lK} \end{bmatrix} \quad \text{(eq. 17)}$$

If it is assumed that there exist L antennas at the receiver, then multi antennas can be used with code repetitions to cancel the CCI if LM≧K is satisfied. Here the number of the cancelled co-channel interference cells is K−1.

For example, if it is assumed that there are 2 receiver antennas and the code repetition is 2, up to 3 interference cells can be cancelled as flows:

$$\begin{bmatrix} Y_i^1 \\ Y_{i+M}^1 \\ Y_i^2 \\ Y_{i+M}^2 \end{bmatrix} = \begin{bmatrix} \hat{H}_i^{11} & \hat{H}_i^{12} & \hat{H}_i^{13} & \hat{H}_i^{14} \\ \hat{H}_{i+M}^{11} & \hat{H}_{i+M}^{12} & \hat{H}_{i+M}^{13} & \hat{H}_{i+M}^{14} \\ \hat{H}_i^{21} & \hat{H}_i^{22} & \hat{H}_i^{23} & \hat{H}_i^{24} \\ \hat{H}_{i+M}^{21} & \hat{H}_{i+M}^{22} & \hat{H}_{i+M}^{23} & \hat{H}_{i+M}^{24} \end{bmatrix} \begin{bmatrix} S_i^1 \\ S_i^2 \\ S_i^3 \\ S_i^4 \end{bmatrix} + \begin{bmatrix} n_i^1 \\ n_{i+M}^1 \\ n_i^2 \\ n_{i+M}^2 \end{bmatrix} \quad \text{(eq. 18)}$$

$$\begin{bmatrix} \hat{S}_i^1 \\ \hat{S}_i^2 \\ \hat{S}_i^3 \\ \hat{S}_i^4 \end{bmatrix} = W_3 \begin{bmatrix} Y_i^1 \\ Y_{i+M}^1 \\ Y_i^2 \\ Y_{i+M}^2 \end{bmatrix} \quad \text{(eq. 19)}$$

$$W_3 = (R_{N_i} + \hat{H}_i^{3^T} \hat{H}_i^3)^{-1} \hat{H}_i^{3^T} \quad \text{(eq. 20)}$$

Figure 3:
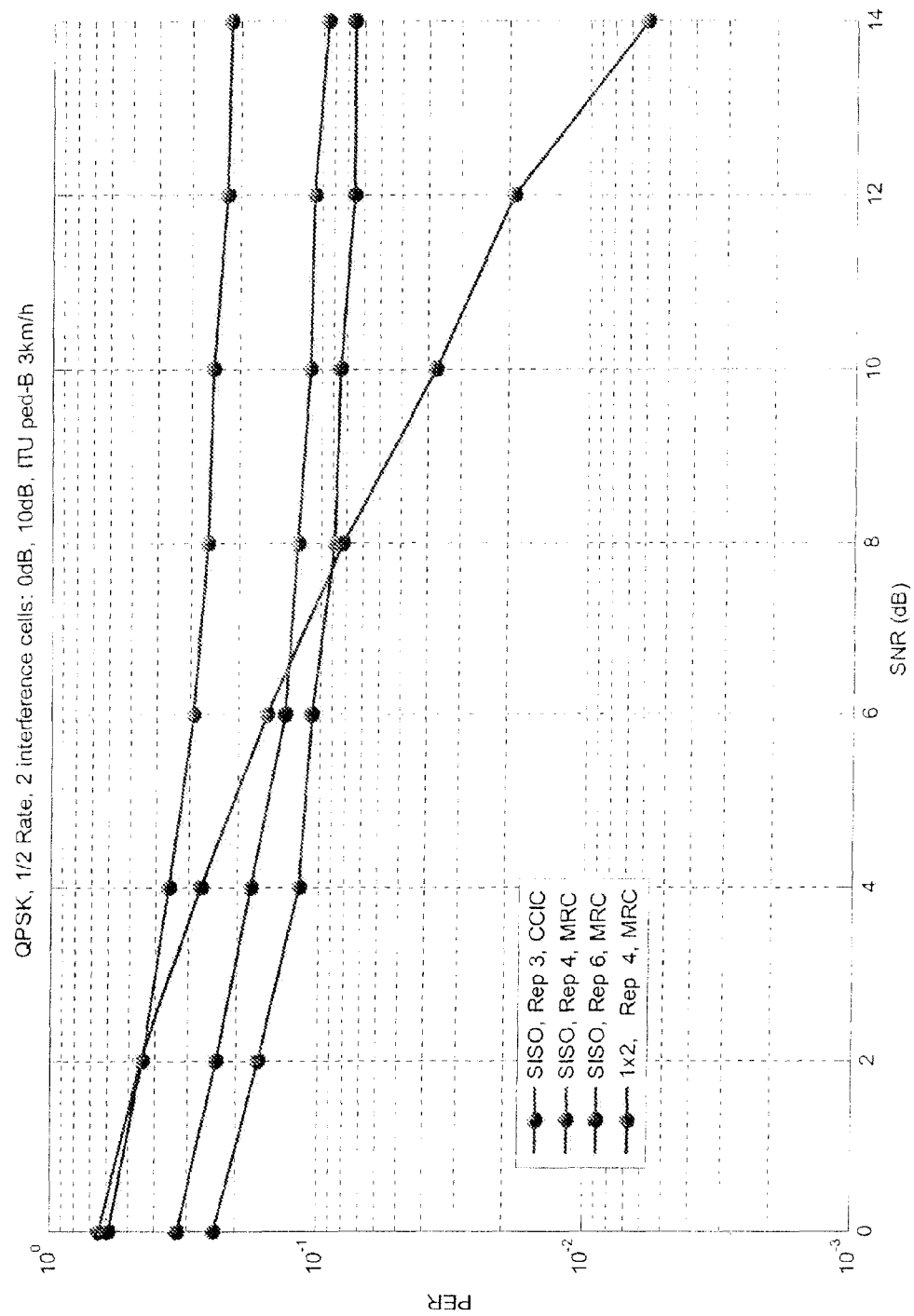
FIG. 3 is a graph comparing co-channel interference cancellation (CCIC) performance with MRC performance for two CCI cells at 0 dB, 10 dB.
Figure 4:
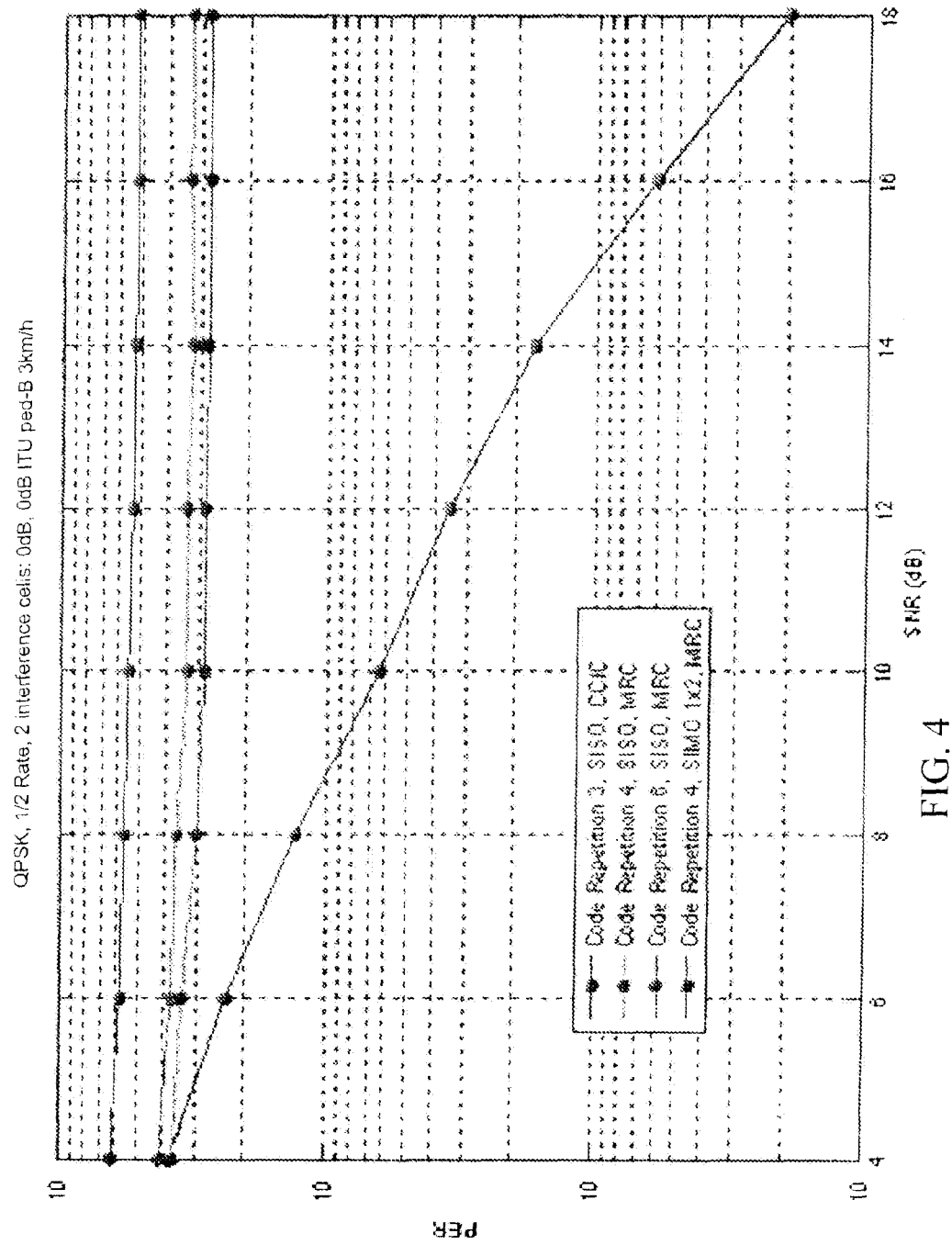
FIG. 4 is a graph comparing CCIC performance with MRC performance for two CCI cells at 0 dB, 0 dB.

A simulated comparison of CCIC and MRC performance is provided in FIGS. 3 and 4, where the performances are obtained based on the parameters listed in Table 1. FIG. 3 shows CCIC performance compared to MRC in the case of 2 CCI cells at 0 dB, 10 dB. FIG. 4 shows CCIC performance compared to MRC in the case of 2 CCI cells at 0 dB, 0 dB.

TABLE 1

Simulation Parameter Setup

| Parameter | Values |
| --- | --- |
| Channel BW | 10 MHz |
| Duplex | TDD |
| Frame duration | 5 ms |
| Sampling rate | 11.2 MHz |
| Cyclic prefix | 1/8 |
| Symbol duration | 0.1028 ms |

TABLE 1-continued

Simulation Parameter Setup

| Parameter | Values |
| --- | --- |
| Number of Cells | 2 strong interference cells |
| DL permutation | PUSC |
| Number of antennas at BS | 1 |
| Number of antennas at MA | Up to 2 |
| Channel | ITU Ped-B (3 km/h) |
| Channel Estimation | Ideal |
| Noise Variance Matrix | known |

As will be appreciated from the comparisons, CCIC provides superior performance than MRC at cell edges.

Figure 5:
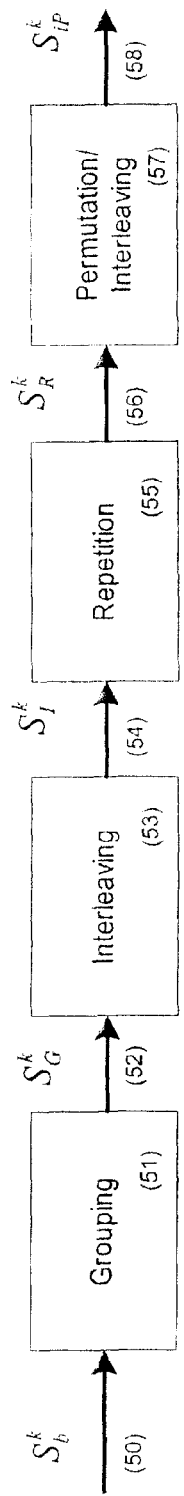
FIG. 5 depicts one example of a transmission procedure according to certain aspects of the invention.

With reference to FIG. 5, a procedure for transmitting according to certain aspects of the invention is described. In certain embodiments information bits 50 are grouped in a plurality of blocks at step 51, wherein the different blocks may have different block sizes. These information bits can comprise un-coded bits (i.e. pre-encoder bits), coded bits (after encoder), modulated symbols or un-modulated symbols. Different ones of coded or modulated blocks may employ coding and modulation schemes that are different from other coded or modulated blocks.

In one example of information bits that are modulated symbols, and assuming that $S_p^k$ is the information symbol packet and k is a transmitter index or cell index, then:

$$S_p^k = [s_1^k \ s_2^k \ \ldots \ s_N^k] \quad \text{(eq. 21)}$$

where, $s^{ik}$ is the information symbol and N is the packet size. $S_p^k$ can be grouped as:

$$S_p^k = S_G^k = [S_{g1}^k \ S_{g2}^k \ \ldots \ S_{gM}^k] \quad \text{(eq. 22)}$$

$S_{gi}^k$ can be referred to as a block and gM is the number of blocks. Each block includes at least one symbol and each symbol in Equation (7) can belong to only one of the blocks. The block size of each block is the same as the number of symbols in the block but block size can differ between blocks. Moreover, different modulation and coding schemes can be used for different blocks. In certain embodiments, grouping order is provided such that a small block number corresponds to a small symbol index. For example, the block $S_{g1}^k = [s_1^k \ s_2^k \ \ldots \ s_{B1}^k]$ and $S_{g2}^k = [s_{B1+1}^k \ s_{B1+2}^k \ \ldots \ s_{B2}^k]$, etc. where $B_1$ and $B_2$ are the sizes of block g1 and g2.

Certain embodiments employ symbol interleaving (step 53) wherein two or more types of interleaving may be used for interleaving the symbols in each block. Each block can have a different interleaving function and symbol interleaving in each block may be independent of symbol interleaving in other blocks. However, in at least some embodiments, interleaving of symbols may be performed across plural blocks. Certain embodiments provide block interleaving wherein a plurality of blocks is interleaved.

The output of an interleaver can expressed as:

$$S_I^k = [S_{I1}^k \ S_{I2}^k \ \ldots \ S_{IM}^k] \quad \text{(eq. 23)}$$

where IM=gM (see signal 54).

In certain embodiments, interleaved blocks may be repeated at step 55 K times, where K is the code repetition number. The repeated signal 56 can be expressed as in Equation (10):

$$S_R^k = [S_{I1}^k S_{I1}^k \ \ldots \ S_{I1}^k S_{I2}^k S_{I2}^k \ \ldots \ S_{I2}^k \ \ldots \ S_{IM}^k \ \ldots \ S_{IM}^k] = [S_{R1}^k \ S_{R2}^k \ \ldots \ S_{RM}^k], \quad \text{(eq. 24)}$$

and $$S_{Ri}^k = [S_{Ii}^k \ S_{Ii}^k \ \ldots \ S_{Ii}^k] \quad \text{(eq. 25)}$$

The number of $S_{Ti}^k$ is determined by the code repetition times for the block. The repetition times for each block can be different, although in these descriptions, a common repetition time is assumed for all blocks.

Certain embodiments provide a permutation process at step 57 that includes regrouping $S_R^k$, inserting additional symbols or blocks into $S_R^k$ and physical channel mapping based on certain predefined rules. In certain embodiments, the permutation step 57 includes interleaving. In one example, regrouping $S_R^k$ can be considered to be a form of interleaving. However, certain embodiments employ a more flexible form of interleaving than permutation. Interleaving can comprise scrambling all of the symbols in Equation (10), scrambling all of the blocks in Equation (10), scrambling part of the symbols in Equation (10) and scrambling part of the block in Equation (10). Different scrambling rules can be provided including random scrambling or following some rules.

At the receiver, the received signal at l-th antenna is expressed as:

$$Z_{i_p}^l = \sum_{k=1}^{K} \Psi_{i_p}^{lk} S_{i_p}^k + N_{i_p}^l \qquad \text{(eq. 26)}$$

where l is antenna index at receiver, $\Psi_{i_p}^{lk}$ is frequency domain channel transfer function from the k-th cell to l-th antenna at the receiver, $N_{i_p}^l$ is an AWGN.

In Equation (25), it can be assumed that at least one transmitted signal is a desired signal at receiver and all others are undesired signals which are referred to herein as "Co-Channel Interferences (CCI)." In seeking to cancel the CCI, it is assumed that all CCI and desired signals have the same block size and the same repetition number meaning that the size of block $S_{gi}^k$ in Equation (22) is the same for any of k, k=1, 2, ... K.

Figure 6:
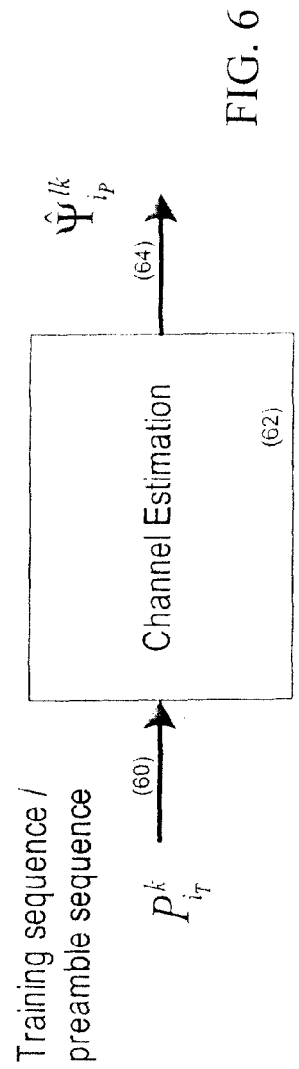
FIG. 6 illustrates a channel estimation operation according to certain aspects of the invention.

Referring now to FIG. 6, certain embodiments perform channel estimation. In order to estimate the channel $\Psi_{i_p}^{lk}$, each of the neighboring cells is typically required to transmit a unique training sequence or unique preamble. Further at the receiver, the unique training sequence or unique preamble can be used for estimating the channel $\hat{\Psi}_{i_p}^{lk}$, k=1, 2, ... K. The channel estimation function can estimate all the neighboring cells' channels which are included in the target cell and CCI cells. The training sequence or preamble sequence can be a time domain or a frequency domain sequence and channel estimation can be performed in the time domain or the frequency domain.

Certain embodiments include de-permutation and/or de-interleaving functions for both received signal $Z_{i_p}^l$ and the estimated channel $\hat{\Psi}_{i_p}^{lk}$, k=1, 2, ... K. Assuming that the de-permutation or de-interleaving function to be $f_{DEP}^k(\ )$. Furthermore, different de-permutation and de-interleaving functions may be required since different cells can have different permutation and interleaving functions. Thus:

$$Z_i^l = f_{DEP}^l(Z_{i_C}^l) \qquad \text{(eq. 27)}$$

$$\hat{\Psi}_i^{lk} = f_{DEP}^k(\hat{\Psi}_{i_p}^{lk}) \qquad \text{(eq. 28)}$$

Assuming here that the target cell index k=1 and considering the correspondence with $S_R^k$ in Equation (24) and (25):

$$Z_R^l = [Z_{R1}^l \ Z_{R2}^l \ldots Z_{RM}^l]^T \qquad \text{(eq. 29)}$$

$$Z_{Ri}^l = [Y_{Ii1}^l \ Y_{Ii2}^l \ldots Y_{Ii(N-1)}^l]^T \qquad \text{(eq. 30)}$$

$$\hat{\Psi}_i^{lk} = [\hat{\Psi}_{R1}^{lk} \ \hat{\Psi}_{R2}^{lk} \ldots \hat{\Psi}_{RM}^{lk}]^t \qquad \text{(eq. 31)}$$

and $$\hat{\Psi}_{Ri}^{lk} = [\hat{H}_{Ii1}^{lk} \ \hat{H}_{Ii2}^{lk} \ldots \hat{H}_{Ii(N-1)}^{lk}]^T \qquad \text{(eq. 32)}$$

Regarding the subscript Iij, i refers to the block index used in Equation (23) and j refers to the repeated block index and j=0, 1, ..., (N-1).

Certain embodiments provide a co-channel interference cancellation function (CCIC) that comprises channel matrix construction, weights calculation and equalization. The channel matrix can be obtained by using Equation (32):

$$\hat{H}_{Ii}^{lK} = \begin{bmatrix} \hat{H}_{Ii1}^{l1} & \hat{H}_{Ii1}^{l2} & \ldots & \hat{H}_{Ii1}^{lK} \\ \hat{H}_{Ii2}^{l1} & \hat{H}_{Ii2}^{l2} & \ldots & \hat{H}_{Ii2}^{lK} \\ \vdots & \ldots & \ldots & \\ \hat{H}_{Ii(N-1)}^{l1} & \hat{H}_{Ii(N-1)}^{l2} & \ldots & \hat{H}_{Ii(N-1)}^{lK} \end{bmatrix} \qquad \text{(eq. 33)}$$

Thus:

$$\begin{bmatrix} Y_{Ii1}^l \\ Y_{Ii2}^l \\ \vdots \\ Y_{Ii(N-1)}^l \end{bmatrix} = \begin{bmatrix} \hat{H}_{Ii1}^{l1} & \hat{H}_{Ii1}^{l2} & \ldots & \hat{H}_{Ii1}^{lK} \\ \hat{H}_{Ii2}^{l1} & \hat{H}_{Ii2}^{l2} & \ldots & \hat{H}_{Ii2}^{lK} \\ \vdots & \ldots & \ldots & \\ \hat{H}_{Ii(N-1)}^{l1} & \ldots & & \hat{H}_{Ii(N-1)}^{lK} \end{bmatrix} \begin{bmatrix} \hat{S}_{Ii}^1 \\ \hat{S}_{Ii}^2 \\ \vdots \\ \hat{S}_{Ii}^K \end{bmatrix} + N_{Ii}^l, \qquad \text{(eq. 34)}$$

where $\hat{S}_{Ii}^k$ is the estimated $S_{Ti}^k$ under some criteria or the output of the equalization function. Assuming that $$\hat{S}_{Ii}^K = [\hat{S}_{Ii}^1 \ \hat{S}_{Ii}^2 \ldots \hat{S}_{Ii}^K]^T, \qquad \text{(eq. 35)}$$

the equalization can be expressed as Equation (36):

$$\hat{S}_{Ii}^K = W_K^l Z_{Ri}^l \qquad \text{(eq. 36)}$$

and the weight $W_K^l$ can be obtained from:

$$W_K^l = \Re_{Est}(\hat{H}_{Ii}^K), \qquad \text{(eq. 37)}$$

where $\Re_{Est}(\ )$ is a function consistent with certain of the criteria. The use of different criteria leads to different functions. For example, under MMSE criteria, Equation (37) can be rewritten as:

$$W_K^l = (R_{N_{Ii}}^l + \hat{H}_{Ii}^{K^T} \hat{H}_{Ii}^K)^{-1} \hat{H}_{Ii}^K. \qquad \text{(eq. 38)}$$

Figure 7:
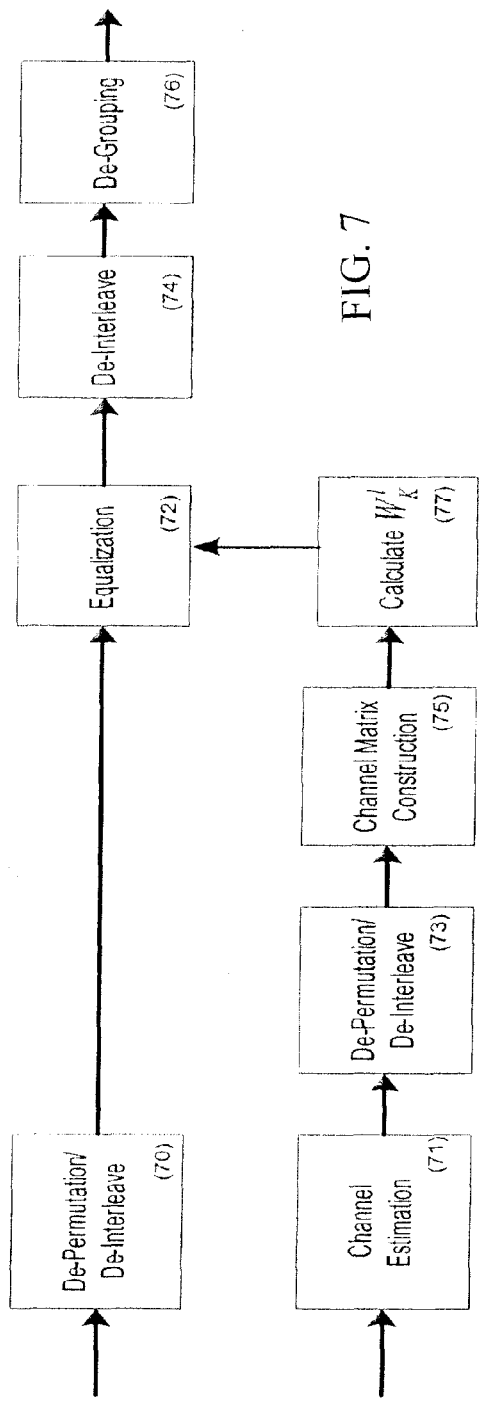
FIG. 7 depicts a generic CCIC receiver that implements one example of a CCIC procedure according to certain aspects of the invention.

FIG. 7 shows one example of a generic CCIC receiver. A processing chain for obtaining the estimated information symbols includes steps 70, 72, 74 and 76 while steps 71, 73, 75 and 77 describe the processing chain required to get side information such as the channel estimate and the construction of channel matrix due to the consideration of an arbitrary permutation map at the transmitter. The side information is ultimately used to obtain a beamformer/despreader which, after any interleaving due to error correction or logical grouping steps gives us our final information symbols. The logical grouping block extracts logical subchannels out of the raw data. While in general, channel estimation does not depend on subcarrier permutation, some information, such as the number of code repetitions may require an initial depermutation.

Figure 12:
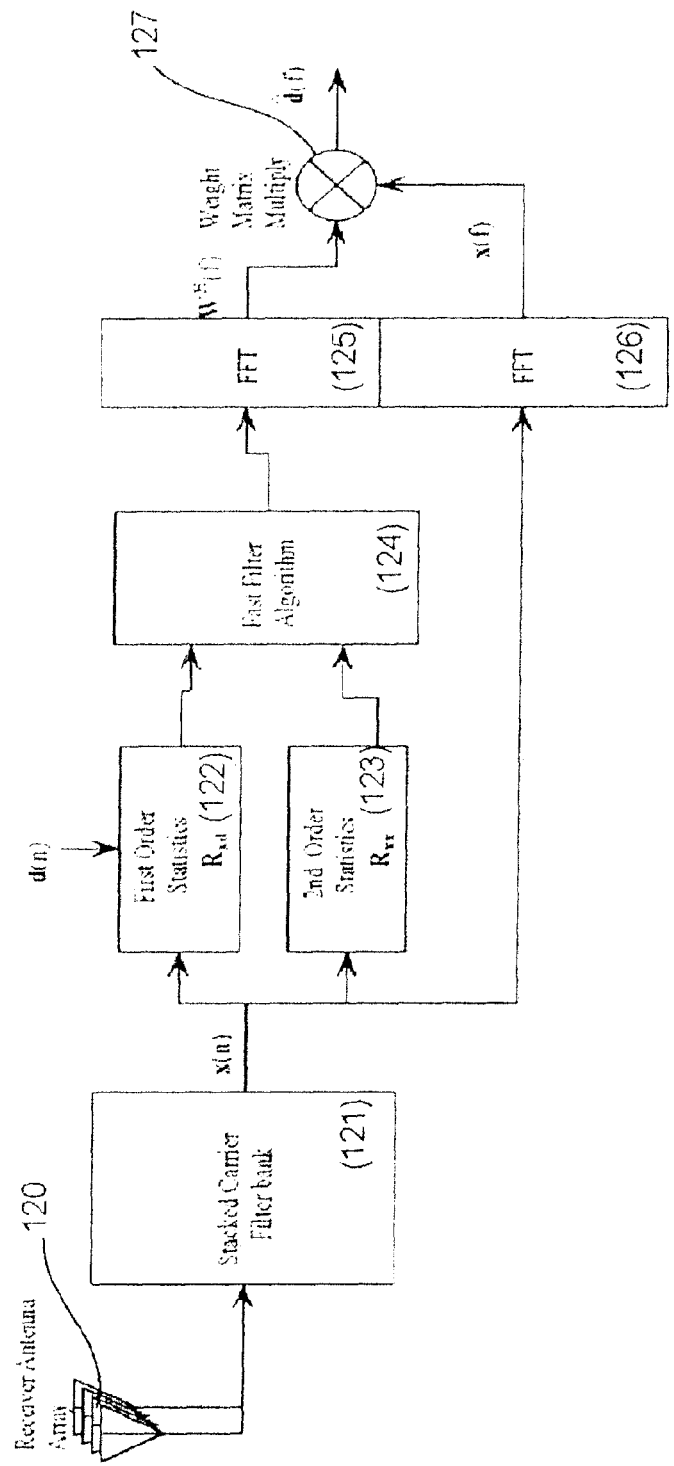
FIG. 12 is a block diagram showing a space time adaptive beam-former.

With reference also to FIG. 12, certain of the systems and methods described can be extended to include multi-antennas system when multi-antennas 120 are provided at a receiver (through stacked carrier filter bank 121). For example, equation (34) can be extended to multi-antenna embodiments as:

$$\begin{bmatrix} Z_R^1 \\ Z_R^2 \\ \vdots \\ Z_R^L \end{bmatrix} = \begin{bmatrix} \hat{H}_{Ii}^{1K} \\ \hat{H}_{Ii}^{2K} \\ \vdots \\ \hat{H}_{Ii}^{LK} \end{bmatrix} \begin{bmatrix} \hat{S}_{Ii}^1 \\ \hat{S}_{Ii}^2 \\ \vdots \\ \hat{S}_{Ii}^K \end{bmatrix} + N_{Ii}^L \quad \text{(eq. 39)}$$

Equations (35-38) can be easily extended to multi receiver antenna case. If $LN \geqq K$ can be satisfied, (K−1) co-channel interferences can be cancelled.

Certain embodiments of the invention address the issues associated with CCI using a time domain preamble symbol instead of the current frequency domain preamble sequence for estimating the channel. By using a time domain preamble, channel estimation performance can be improved, and the obtained improvements can offset or cancel co-channel interference. MAP performance can also be improved significantly without increasing the overhead.

Multi-User Detection

In certain embodiments multi-user detection techniques may be deployed to improve performance of a receiver. Such techniques can provide useful result when a sufficient number of samples are available. Given the assumption that $Q \leqq Q'$, where Q' is the total number of resolvable base stations, the diagonal components of $A^H R_{ii}^{-1} A$ are estimates of the signal SINR and can help to determine which signals are the most promising. Each signal is linear beam-formed and passed through a demodulation/remodulation process. In one example, this latter process may involve recovering the nearest constellation point. The signal can then be removed from the received data, a new $R_{ii}$ can be estimated and the process repeated. The steps of the algorithm can be describes as follows:

1. Compute $w_0 \equiv R_{ii}^{-1} A(I + A^H R_{ii}^{-1} A)^{-1}$.
2. Compute the best linear estimate $\hat{d}(n) = w_0^H x(n)$.
3. Compute the information symbols "closest" to $\hat{d}(n)$ by exploiting the constellation and or any error correcting codes, $\tilde{d}(n)$.
4. Estimate the channel matrix for unmodeled users $\hat{A} = \langle x(n) \tilde{d}^H(n) \rangle R_{dd}^{-1}$.
5. Remove the demodulated waveform from the received data for the strongest emitters, $x(n) \leftarrow x(n) - A\tilde{d}(n)$.
6. Estimate a new interference covariance $R_{11} \leftarrow \langle x(n) x^H(n) \rangle$
7. Add a new pseudo-random steering vector(s) to the last column of the A matrix.
8. Return to step 1.

In certain embodiments, additional steps may be taken to guarantee that newly acquired users are not converging to users that already exist in this blind acquisition process. One technique that can be used applies a constraint that keeps the matrix, $A^H R_{ii}^{-1} A$ near to diagonal. Other embodiments employ one or more variations related to which set of emitters should remain captured within the A matrix and which emitters can be removed from the data x(n). Certain embodiments limit performance of these steps to a few iterations to avoid overmodeling the received data thereby causing divergence.

Although these methods and systems have been discussed in the context of processing downlink broadcast signals and downlink training signals, certain embodiments employ this same technology for uplink processing in various applications. In one example, when time domain uplink training messages are transmitted from plural subscribers, a base station can learn the corresponding uplink channel (A matrices) for its in-cell users and possibly nearby out-of-cell users. As will be described in more detail below, this training process can also learn out-of-cell (or even in-cell) space-time interference covariance processes. The latter is particularly important for enabling spatial beam-forming, since it helps to model $R_{ii}$.

Code Repetition in WiMAX

Figure 11:
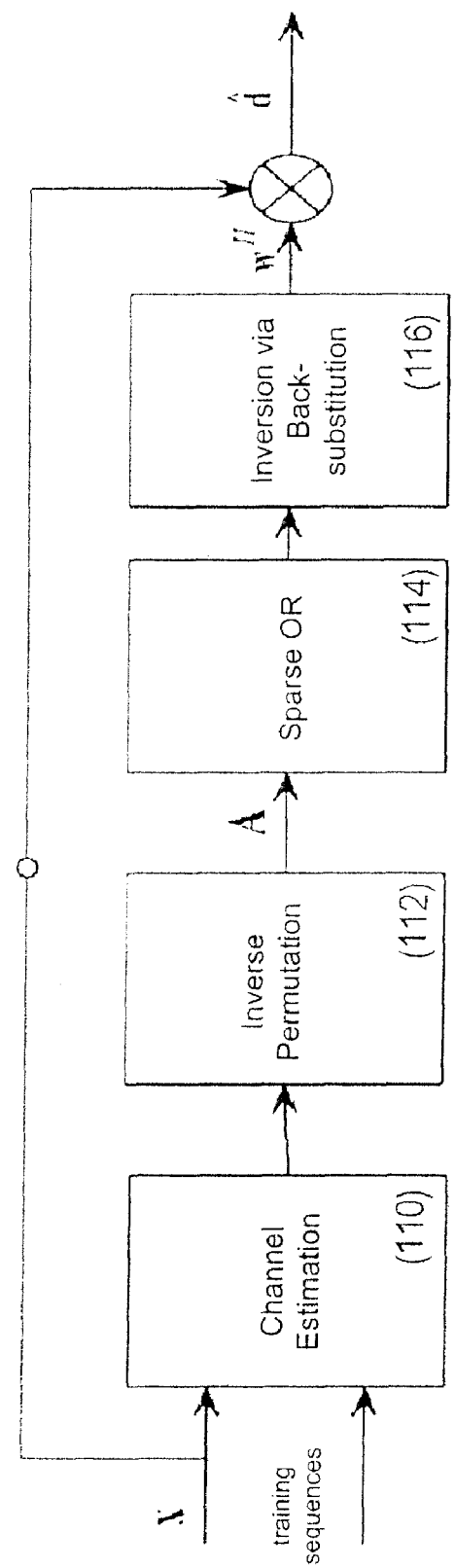
FIG. 11 depicts one method for computing weights in a stacked carrier despreader.

In accordance with WiMAX, the MAP information is repeated between 2 and 6 times after encoding. In certain embodiments, coding repetition can be exploited to cancel CCI. The repetition can be used as the stacking index k in Equation 35 and thereafter. For simple repetition, the transmit stacked carrier gains can simply be $g_k=1$. In a single OFDM symbol, along with K repetitions, there is another factor of $M_{fec}$ coding blocks each of $N_{fec}$ subcarriers, making the total number of subcarriers utilized $KM_{fec}N_{fec}$. However, the ordering of the subcarriers can be randomized, scrambled according to different permutations specified in the WIMAX standard. Thereafter, pilots may be inserted to fill out the remainder of the OFDM symbol. FIG. 11 shows one procedure generating OFMD symbols.

In certain embodiments, the repetition code concept can be extended by replicating the forward error correcting (FEC) blocks with an additional scaling by the stacked carrier transmit gains $g_k$. Depending upon the permutation employed, the replicated subcarriers can be treated as n indices in Equation 36 or as separate independent receive channels. The subcarriers that are most closely spaced can be considered as reuses of the same channel and therefore qualify as n indices. Widely-spaced subcarriers can be treated as independent channels. The stacked carrier concept can also be generalized to allow the subcarriers to be stacked to become dependent on the subcarrier index. This allows the frequency spacing between stacked carriers to vary slightly, without affecting the basic narrow band antenna model exploited in Equation 36. In an example based on the currently implemented WIMAX standard, a set of weights for each logical subcarrier in the replicated subchannel can be developed, since neighboring logical subcarriers are widely spaced after the permutation map. In this example, the spacing between subcarriers in the stacked carrier concept may also vary and must typically be tracked for other base stations as well as for the current base station in order to fill out the steering vectors with the correct channel estimate values. This approach can be especially useful when the permutation mapping for the downlink map is not allowed to vary from base station to base station.

However, in the example of the current WiMAX standard, a base dependent permutation of the subcarriers prevents perfect alignment of the K repetitions of a given information symbol from one base station to another. However, if the number of downlink MAP informational elements are bounded, this imperfection may be accommodated by noting that if a base station's subcarrier does not intersect with the set of K repetitions for a mobile station's assigned base station, then the channel response is effectively zero for that subcarrier and the channel response can be viewed as having a zero value for the spreading code for that subcarrier k, i.e. $g_k=0$ in Equation 37. Therefore in the WIMAX example, for each set of K subcarriers to be despread using the linear weight vector, the permutation mapping from the neighboring interfering base station must be identified, and $g_k=0$ can be applied to the non intersecting subcarriers with $g_k=1$ being applied to the intersecting subcarriers. The channel, itself in the form of steering vectors, can be estimated using time domain training sequences that employ fixed transmit weights and it can be assumed that any frequency spreading uses $g_k=1$. Also in the specific case of dealing with the downlink MAP, it can be generally assumed that the unmodeled interference is white and proportional to the identity matrix, so that $R_{ii}=\sigma_n^2 I$ in Equation 38.

Figure 15:
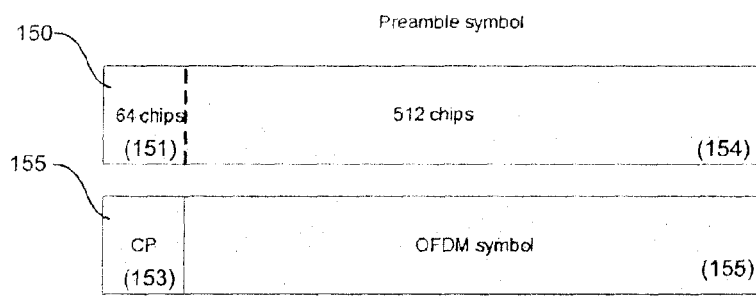
FIG. 15 illustrates preamble structure and timing.

If a repetition code of length K is used, standard array processing theory suggests that up to K−1 interferers can be cancelled and that the remaining degrees of freedom contribute to the array gain. Thus the array gain will be K−U, where K is number of degrees of freedom and U is the number of strong co-channel emitters. In one example of a receiver, the processing steps are shown in FIG. 15. After the FFT, the pilots are stripped out and a depermutation occurs, wherein the permutation structure is tracked and one or more sets of receiver weights is subsequently developed using Equation 39.

Stacked Carrier Sparse Matrix Inversion Technique

Figure 16:
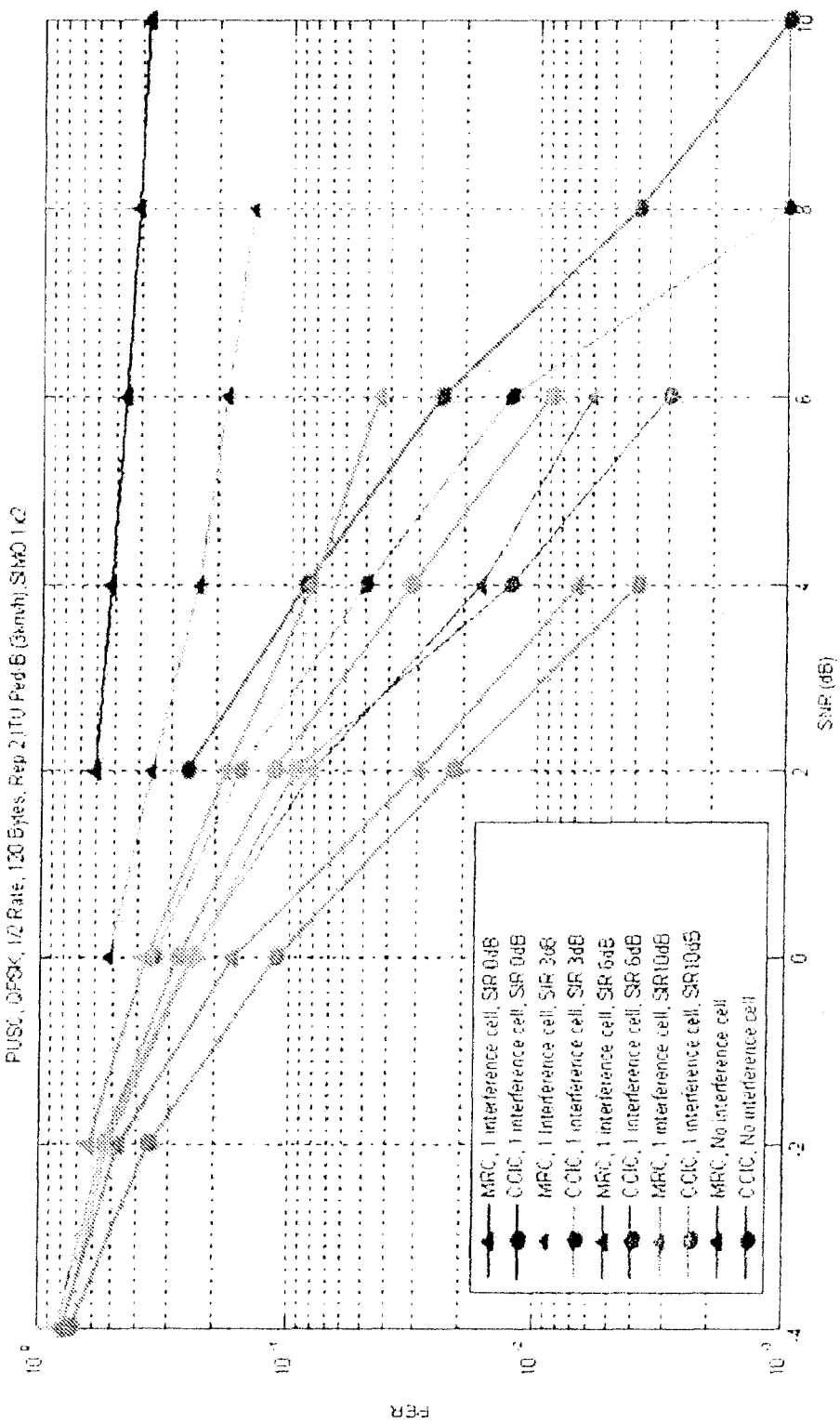
FIG. 16 is a graph comparing MRC and CCIC for one CCI cell.
Figure 17:
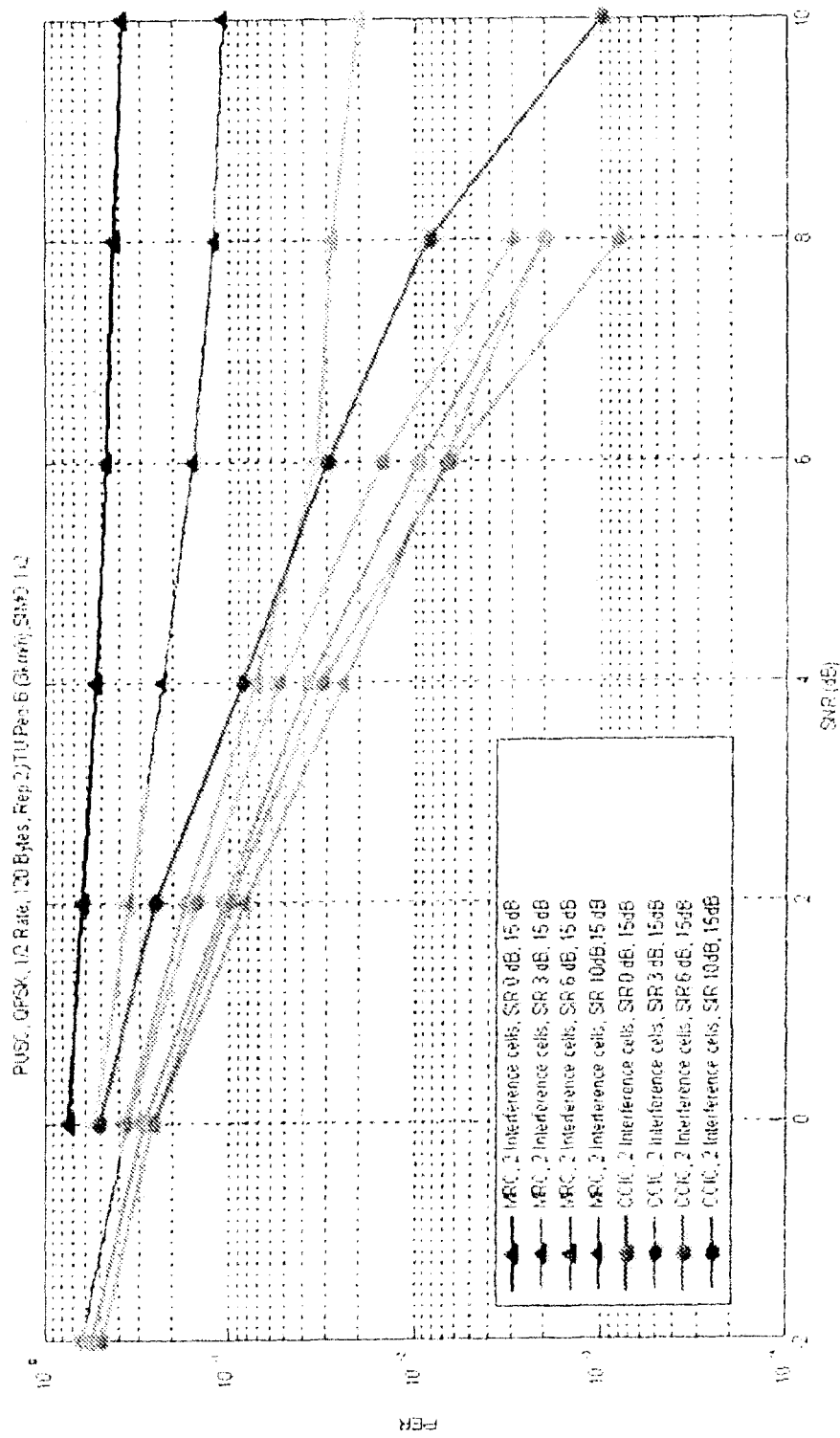
FIG. 17 is a graph comparing MRC and CCIC for two CCI cells.
Figure 18:
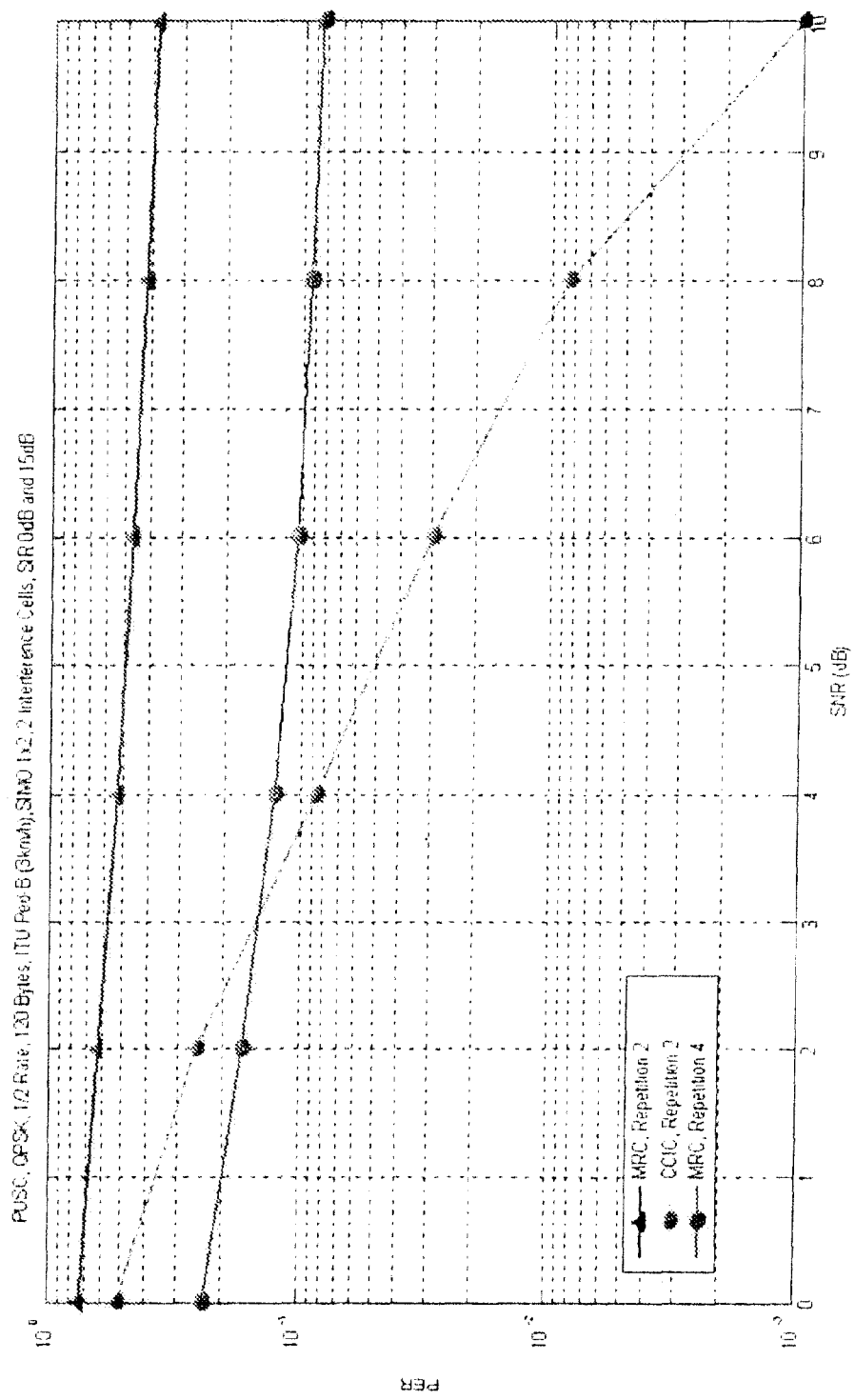
FIG. 18 is a graph comparing MRC and CCIC for different coding repetitions.
Figure 19:
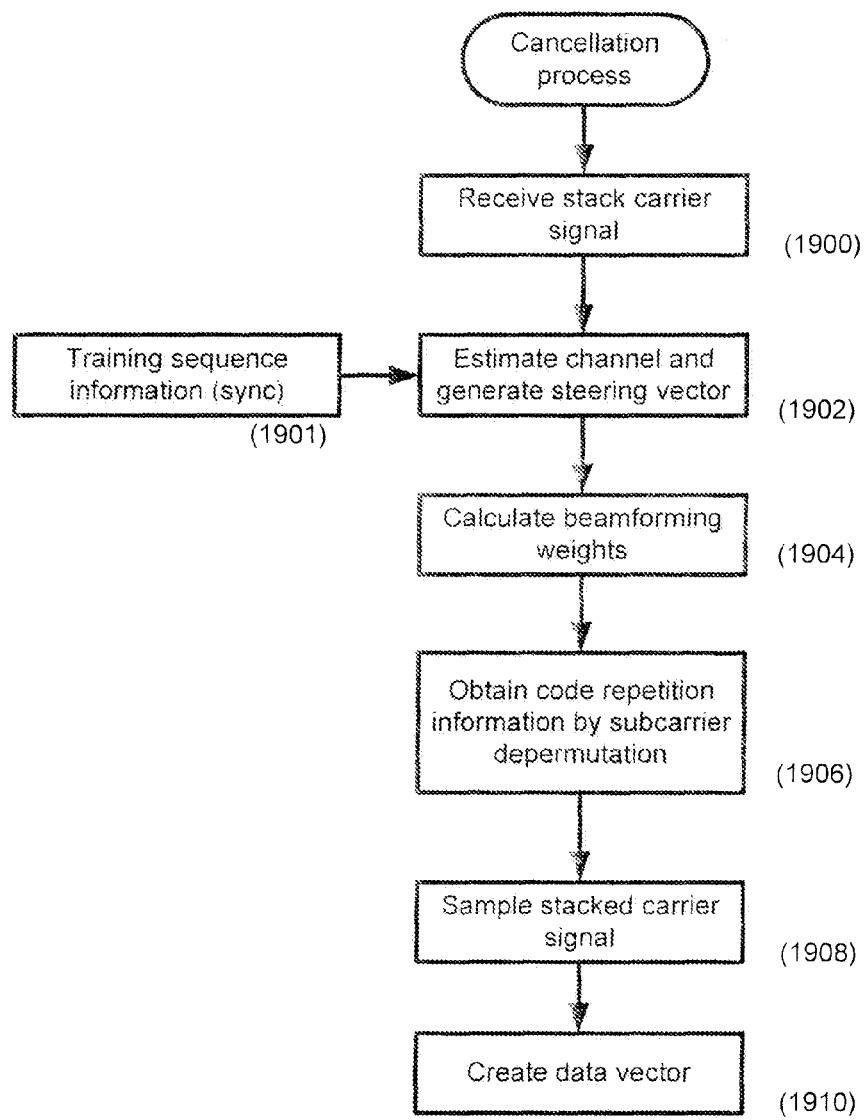
FIG. 19 shows one example of a process for enhancing interference cancellation according to one embodiment of the invention.

With reference to FIG. 16, certain embodiments employ processes for handling systems conforming to unmodified versions of the WiMAX with based dependent permutations. The spreading factor K can be expanded to include either all of the available subcarriers or enough subcarriers so that the row dimension of the channel matrix A exceeds the column dimension in Equation 36. It will be appreciated that, in Equation 40 below, only a single reuse of the channel is considered and $x = Ad + i$ $\hat{d} = w^H x$ (eq. 40)

$w = R_{ii}^{-1} A (I + A^H R_{ii}^{-1} A)^{-1}$. (eq. 41)

The meaning of Q is altered in this section to consider all signals from all interfering base stations, so that $d_q$ represents the information symbol associated with the q'th informational element, and where 1:Q, includes all the informational elements from all base stations. Each informational element is spread over R pseudo-random frequency subcarriers, and the R frequencies chosen, are nearly random from one column to the next. It can be expected that R<<K. An interfering base station will have typically more than one informational element. Therefore, for the downlink MAP application, a single base station may be devoted to more than one column of the channel matrix A. Each qth column will typically be very sparse, having nonzero entries only at the R frequencies over which the transmitted information symbol $d_q$ is spread.

In certain embodiments, optimal linear despreading weights can be computed from Equation 41. Although both the row and column dimensions of A are potentially large, A is extremely sparse with only a fraction (R/K) of the entries being nonzero. In the limit as K approaches the size of the total number of subcarriers in the OFDM symbol, it can be expected that the column dimension is equal to C=UK/R, where U is the number of interfering emitters. Thus provided that U<R, an over-determined system results that can be inverted for some signal processing gain. The interference covariance $R_{ii}$ will typically be modeled here as white noise and therefore a scalar of the identity, though a simple extension can also allow for a diagonal covariance matrix.

The inversion in Equation 41 can be achieved by exploiting the sparsity of A. Certain embodiments employ a QR-decomposition on A using Givens rotations such that A=QR, with Q a Unitary matrix and R an upper triangular matrix. Assuming for the purpose of this analysis that $R_{ii}=\sigma^2 I$, $w = A(\sigma^2 I + R^H R)^{-1} = A R_+^{-1} R_+^{-H}$ $R_+^H R_+ = \sigma^2 I + R^H R$ The $R_1$ matrix can be found by employing a sparse QR algorithm (Givens rotations) to obtain the augmented matrix:

$$A_{aug} \equiv \begin{pmatrix} R \\ \sigma I \end{pmatrix}$$

$A_{aug}^H A_{aug} = R_+^H R_+$.

Since only the columns of w associated with the informational elements in the base station associated with a given mobile station are required, computations are further reduced to:

$\hat{d}_1 = I_1 R_+^{-1} R_+^{-H} A^H x,$ where $I_1$ is a $C_1 \times C$ truncated identity matrix with the top $C-C_1$ rows removed corresponding to the out of cell informational elements and where it is assumed that the bottom $C_1$ elements of d contain the in-cell informational elements. Rather than compute the inverse, back substitution can be used to implement multiplication by $R_+^{-1} R_+^{-H}$. Back substitution is preferable in this case since $R_+$ should still be relatively sparse. The bottom of d is used so that back substitution can still proceed easily on the truncated $\hat{d}$ output. At a high level, the steps involved in the implementation of the despreader for this case are shown in FIG. 11. Although the basic block diagram is valid for any stacked carrier despreader, the example shown calls out components to be used when the channel matrix A is sparse.

Space Time Adaptive Beam forming

It is contemplated that certain embodiments may beam-form directly in the frequency domain over a narrow frequency band or where the frequencies are spread but incorporated into the channel or steering vector. Wide band beam-forming in the time domain may also be used, where the beam-forming would be facilitated by the transmission of a known training sequence. For example, in OFDM systems training may comprise training of a beam-forming temporal process in the time domain which would permit conventional beam-forming over each subcarrier when transferred to the frequency domain.

The beam-forming problem in the time domain can be formulated as a least squares estimation problem which typically is equivalent to the maximum likelihood estimate under various assumptions. In one example, a time domain beam-former, or space-time adaptive beam-former (STAP) takes the form:

$W^H(n) * x(n) = \hat{d}(n)$ $\hat{d}(n) \approx d(n)$ $$W^H(n) * x(n) \equiv \sum_{k=-K_1}^{K_2} W^H(k) x(n-k),$$

where d(n) is defined in Equation 37, and W(k) is a $M_s \times Q$ beam-forming matrix and where $M_s = MK$ is the dimension of the received data vector x(n). It can be assumed that, in the time domain, the waveform is optionally received over a set of band pass filters, one filter for each stacked carrier. Note also that the filter can be non-causal in order to accommodate the cyclic prefix typically used in OFDM. With the subscriber advancing its transmission gate, to remove propagation delays, important waveform information will be present in the cyclic prefix.

In certain embodiments, it is desirable to minimize the MSE objective function written as the time averaged error over n:

$$\mu = \langle \|\hat{d}(n) - d(n)\|^2 \rangle_n.$$

Setting the first derivatives to zero, the necessary conditions for a global optimum of the convex problem can be obtained. The derivatives are:

$$\frac{\partial \mu}{\partial W^*(k)} = \left\langle \sum_{k'} x(n-k)x^H(n-k')W(k') - x(n-k)d^H(n) \right\rangle_n$$

$$= \sum_{k'} R_{xx}(k-k')W(k') - R_{xd}(k),$$

where $$R_{xx}(k'-k) \equiv \langle x(n-k)x^H(n-k') \rangle_n$$

$$R_{xd}(-k) \equiv \langle x(n-k)d^H(n) \rangle_n.$$

For OFDM waveforms, the time shifts can be viewed as cyclic shifts. Setting the derivatives to 0, the necessary conditions force a solution of the form:

$$W = R_{XX}^{-1} R_{Xd},$$

where $$W \equiv [W^H(K_1), W^H(K_1-1) \ldots, W^H(-K_2)]^H$$

$$R_{Xd} \equiv [R_{xd}^H(-K_1), R_{xd}^H(-K_1+1) \ldots, R_{xd}^H(K_2)]^H$$

$$R_{XX} \equiv \begin{pmatrix} R_{xx}(0) & R_{xx}(-1) & \ldots & R_{xx}(-K_1 - K_2) \\ R_{xx}(1) & R_{xx}(0) & \ldots & R_{xx}(1 - K_1 - K_2) \\ \vdots & \vdots & \ddots & \vdots \\ R_{xx}(K_1 + K_2) & R_{xx}(K_1 + K_2 - 1) & \ldots & R_{xx}(0) \end{pmatrix}.$$

Because of the Toeplitz structure of $R_{XX}$ there exist fast algorithms for inverting the $R_{XX}$ matrix and solving for W. Indeed the necessary conditions, $$\sum_{k'} R_{xx}(k+k')W(k') = R_{xd}(k)$$

can be solved by taking the Fast Fourier Transform of both sides (after choosing $K_1+K_2+1$ to be a power of 2), so that in the Fourier domain with index m the necessary conditions become:

$$\tilde{R}_{xx}(-m)\tilde{W}(m) = \tilde{R}_{xd}(-m)$$

where is used to indicate the Fourier transform.

A summary of the steps required to obtain the linear STAP beam-former is provided in FIG. 12. Note that in the example shown, one method of applying weights in the frequency domain is shown, which can be useful for OFDM processing. Since the weights represent a matrix convolution, applying the weights after performing an FFT separately on the received data and on the weights themselves will typically be more efficient.

Channel Estimation

Figure 13:
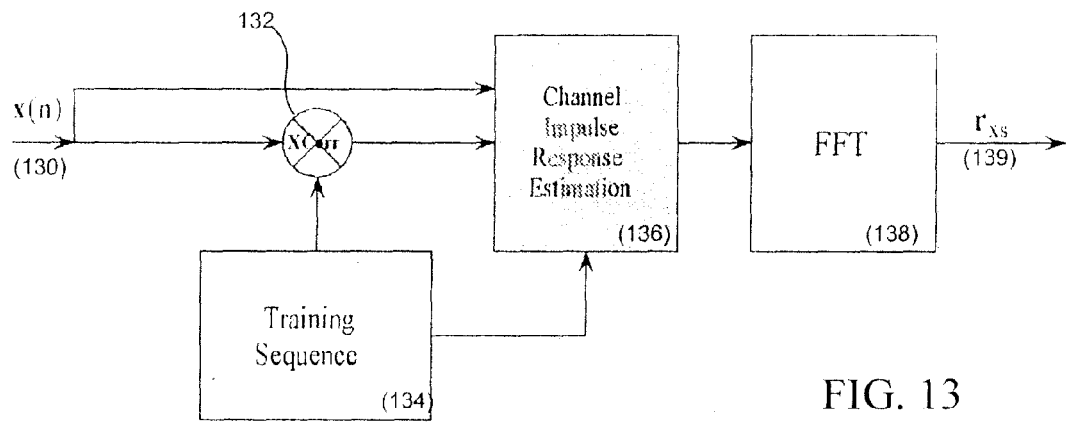
FIG. 13 shows a channel estimation process.

Turning now to FIG. 13, the problem of channel estimation can be considered whereby the A matrix and the interference covariance used in the previous section can be obtained. In certain embodiments, channel estimation in the sampled time domain can be used to obtain a model of the vector impulse response over a set of discrete known delays. The Fast Fourier Transform (FFT) 138 of the channel impulse response 136 and the interference whitening filter can be taken to provide models for the channel and interference at any desired frequency subcarrier.

For the purpose of this description, it can be assumed that a known wideband training sequence 134 is transmitted from a given base station. This assumption may be generalized to include training sequences from several nearby base stations. Base stations that are further out can be modeled as quasi-stationary noise processes. For this scenario, there is a space-time model in the time domain:

$$x(n) = \sum_{j=1}^{J} h_j(n) * s_j(n) + i(n) \quad \text{(eq. 42)}$$

$$= \sum_{j=1}^{J} \sum_{k=0}^{K} h_j(k) s_j(n-k) + i(n)$$

where h(n) is an M×1 impulse response sequence, $s_j(n)$ is a training sequence and i(n) is an interference plus noise process. Note that in this formulation $h_j(n)$ includes both the channel propagation and any transmit linear combining weights used at a given emitter.

The interference process may comprise a sum of many out of cell transmissions and can be modeled as a Gaussian MA process. Therefore, it is assumed that:

$$i(n) = \sum_{k=0}^{K} B(k) u(n-k)$$

$$u(n) = i(n) - \sum_{k=1}^{K} B(k) u(n-k),$$

where it can be assumed that B(0)=I and that u(n) is a complex Gaussian noise process independent over n and $u(n) \sim CN_1^M(0, R_{uu})$. It is further assumed that there are 1-1 mappings between the processes, $x(n) \Leftrightarrow i(n) \Leftrightarrow u(n)$. From this the conditional distribution is:

$$p_u(x(n)|u(n-1), u(n-2) \ldots u(n-K)) = \pi^{-M} |R_{uu}|^{-1} etr(-R_{uu}^{-1} u(n) u^H(n))$$

$$u(n) = x(n) - \sum_{k=1}^{K} B(k) u(n-k) - \sum_{k=0}^{K} H(k) s(n-k), \quad \text{(eq. 43)}$$

where $$H(k) \equiv (h_1(k), h_2(k), \ldots, h_J(k))$$

$$s(n) = (s_1(n), s_2(n), \ldots, s_J(n))^T.$$

The joint distribution can be written from this as:

$$p_x(x(n), x(n-1), x(n-2), \ldots) = p_u(x(n) | u(n-1), u(n-2) \ldots)$$

$$p_u(x(n-1) | u(n-2), u(n-3) \ldots) \ldots$$

$$= \prod_q \pi^{-M} |R_{uu}|^{-1} etr(-R_{uu}^{-1} u(n-q) u^H(n-q)).$$

where $$u(n-q) = x(n-q) - \sum_{k=1}^{K} B(k)u(n-k-q) - \sum_{k=0}^{K} H(k)s(n-k-q). \quad \text{(eq. 44)}$$

Therefore, for maximum likelihood (ML) estimation purposes the log likelihood is:

$$\rho_{ML} \sum_q (-\log(|R_{uu}|) - Tr(R_{uu}^{-1} u(n-q) u^H(n-q))). \quad \text{(eq. 45)}$$

Although ML estimation is used in this example for channel estimates, it will be assumed that $u(n-q)=0$ for large enough q. For the environment of this example, this assumption is nearly valid, since the training sequences have finite extent. However, the primary reason for taking the assumption is to obtain a generalized version of the Yule-Walker equations, which are consistent and stable solutions to the channel estimation problem. $\rho_{ML}$ is differentiated by the unknown channel matrices to obtain the necessary conditions.

The necessary conditions for the estimation of H(k), and B(k) are:

$$\sum_q x(n-q) s^H(n-k-q) = \sum_{m=0}^{K} H(m) \sum_q s(n-m-q) s^H(n-k-q) +$$

$$\ldots \sum_{m=1}^{K} B(m) \sum_q u(n-m-q) s^H(n-k-q)$$

$$\sum_q x(n-q) u^H(n-k-q) = \sum_{m=1}^{K} B(m) \sum_q u(n-m-q) u^H(n-k-q) +$$

$$\ldots \sum_{m=0}^{K} H(m) \sum_q s(n-m-q) u^H(n-k-q).$$

It will be appreciated that the inverse spatial covariance matrix $R_{uu}^{-1}$ can be canceled from both sides of the necessary conditions. By changing variables n'=n−q and sum over n' and divide both sides by the time support length of the training sequences, then:

$$R_{xs}(k) = \sum_{m=0}^{K} H(m) R_{ss}(k-m) + \sum_{m=1}^{K} B(m) R_{su}^H(k-m)$$

$$R_{xu}(k) = \sum_{m=0}^{K} H(m) R_{su}(k-m) + \sum_{m=1}^{K} B(m) R_{uu}(k-m)$$

where $$R_{xs}(k) \equiv \langle x(n+k) s^H(n) \rangle_n$$
$$R_{ss}(k) \equiv \langle s(n+k) s^H(n) \rangle_n$$
$$R_{su}(k) \equiv \langle s(n+k) u^H(n) \rangle_n$$
$$R_{xu}(k) \equiv \langle x(n+k) u^H(n) \rangle_n$$
$$R_{uu}(k) \equiv \langle u(n+k) u^H(n) \rangle_n$$

and where the time averages are taken over the support (non-zero elements) of s(n) and u(n). Further, the convention that the data components x(n) are defined to be 0 when indexed outside of the collection interval may be adopted. This may be expressed as:

$$R_{xv} = C R_{vv},$$

where $$R_{vv} \equiv \begin{pmatrix} R_{ss}(0) & R_{ss}(1) & \ldots & R_{ss}(K) & R_{su}(1) & R_{su}(2) & \ldots & R_{su}(k) \\ R_{ss}(-1) & R_{ss}(0) & \ldots & R_{ss}(K-1) & R_{su}(0) & R_{su}(1) & \ldots & R_{su}(K-1) \\ \vdots & \vdots & \ldots & \vdots & \vdots & \vdots & \ldots & \vdots \\ R_{ss}(-K) & R_{ss}(-K+1) & \ldots & R_{ss}(0) & R_{su}(1-K) & R_{su}(2-K) & \ldots & R_{su}(0) \\ R_{su}^H(-1) & R_{su}^H(0) & \ldots & R_{su}^H(K-1) & R_{uu}(0) & R_{uu}(1) & \ldots & R_{uu}(K-1) \\ R_{su}^H(-2) & R_{su}^H(-1) & \ldots & R_{su}^H(K-2) & R_{uu}(-1) & R_{uu}(0) & \ldots & R_{uu}(K-2) \\ \vdots & \vdots & \vdots & \vdots & \vdots & \vdots & \vdots & \vdots \\ R_{su}^H(-K) & R_{su}^H(-K+1) & \ldots & R_{su}^H(0) & R_{uu}(1-K) & R_{uu}(2-K) & \ldots & R_{uu}(0) \end{pmatrix}$$

$$C \equiv (H(0), H(1), \ldots H(K), B(1), B(2), \ldots B(K))$$

$$R_{xv} \equiv (R_{xs}(0), R_{xs}(1), \ldots R_{xs}(K), R_{xu}(1), R_{xu}(2), \ldots, R_{xu}(K)).$$

$R_{xv}$ is an M×(KM+KJ+K) matrix, C is a M×(KM+KJ+K) matrix and $R_{vv}$ is an (KM+KJ+K)×(KM+KJ+K) matrix. If all of the second order statistics are available, then a solution to the problem would be to compute:

$$C = R_{xv} R_{vv}^{-1}. \quad \text{(eq. 46)}$$

However, a causality dilemma exists with regards to the temporally whitened noise process u(n). In order to apply the AR filter B(k) to x(n) to get u(n) in Equation 43 it is necessary to know both B(k) and H(k). This can be accomplished using a bootstrapping technique that provides initial estimates for these quantities. The bootstrapping technique employs the assumption that the cross correlation terms between s(n) and u(n) are zero, $R_{su}(k)=0$. This immediately decouples the estimation of H(k) from B(k) and thus the H(k) can be determined by direct correlation of the training sequences s(n) with x(n).

Given H(k) the signal component excited by the s(n) can be subtracted out of x(n), leaving i(n). The latter can be temporarily whitened using standard blind linear system identification techniques as described by Orfandis, independently applied to each antenna feed.

Once initial channel matrices H(k) and B(k) are obtained, the inverse filter in Equation 43 can be applied to obtain the u(n) process. The normal equations in Equation 46 can then be solved using fast recursive techniques for block Toeplitz matrices. This in turn permits improved estimation of the channel matrices.

Certain embodiments use ML estimation to obtain R:

$$\hat{R}_{uu} = \langle u(n)u(n)^H \rangle_n.$$

Once the channel estimates are obtained, they can be used to create models for A and $R_{ii}$ in the frequency domain for any subcarrier of an OFDM system. For frequency subcarrier f the channels can be written as:

$$A(f) = \sum_{k=0}^{K} H(k)e^{-2\pi k f}$$

$$B(f) = \sum_{k=0}^{K} B(k)e^{-2\pi k f}$$

$$R_{ii}(f) = NB(f)R_{uu}B^H(f)$$

$$R_{ii}^{-1}(f) = \frac{1}{N}D^H(f)R_{uu}^{-1}D(f), \quad \text{(eq. 47)}$$

where N is the length of the discrete Fourier transform and $D(f) \equiv -B^{-1}(f)$. All of the frequency components can be found using fast Fourier transforms (FFT). If an AR model is used for i(n), D(f) can be computed directly, making it possible to find the inverse covariance for all f using a single matrix inverse.

Observation of the magnitudes of the elements of H(k) facilitates the "thresholding" of these values to obtain an estimate of the time support (number of nonzero samples) and an indication of which users are transmitting. For the latter, the peak lag (the largest magnitude of H(k)) can be used as a screen to determine which emitters are actually transmitting during a given transmission block or OFDM symbol, since each training sequence will be associated with a unique emitter.

A high level block diagram of the channel estimation process is shown in FIG. 13. In the simplest case, it is assumed that the training sequence 134 is uncorrelated with other training sequences and lagged training sequences and is further uncorrelated with the interference process, the channel estimation 136 reduces to nothing more than a cross correlation of the received data against the training sequence. More exacting models attempt to remove the interference process and/or decorrelate against other emitters or channel delayed versions of the emitter waveforms. After the time domain impulse response is estimated, the frequency domain response can be computed using the FFT 138, from which is obtained the second order cross correlation statistics used in the standard normal equations for computing the beam-forming weights.

Bootstrapping H(k) and B(k).

Certain embodiments employ a bootstrapping procedure that may be summarized in the following steps:

1. Solve $H = R_{xs}R_{ss}^{-1}$ where:

$$H \equiv (H(0), H(1), \ldots H(K))$$

$$R_{xs} \equiv (R_{xs}(0), R_{xs}(1), \ldots R_{xs}(K))$$

$$R_{ss} \equiv \begin{pmatrix} R_{ss}(0) & R_{ss}(1) & \ldots & R_{ss}(K) \\ R_{ss}(-1) & R_{ss}(0) & \ldots & R_{ss}(K-1) \\ \vdots & \vdots & \ldots & \vdots \\ R_{ss}(-K) & R_{ss}(-K+1) & \ldots & R_{ss}(0) \end{pmatrix}. \quad \text{(eq. 48)}$$

2. Cancel out s(n) by computing:

$$i(n) = x(n) - \sum_{k=0}^{K} H(k)s(n-k).$$

3. Solve for B(n) using linear system identification techniques from the second order statistics of i(n). One approach assumes a simple AR model and uses standard techniques for obtaining the AR model parameters. In this situation the inverse filter may be determined such that $$-\sum_{k=0}^{K} D(k)i(n-k) = u(n),$$

where $D(0) = -I$. The Yule Walker equations for this problem yield:

$$R_{jj}(q) = \sum_{k=1}^{K} R_{jj}(q-k)D(k),$$

where $R_{jj}(q) \equiv \langle i(n+q)i(n)^H \rangle_n$. In matrix form this can be written as:

$$r_J = R_{JJ}D$$

$$R_{JJ}^{-1}r_J = D,$$

where $$r_J \equiv (R_{jj}^H(0), R_{jj}^H(1), \ldots, R_{jj}^H(K))^H$$

$$R_{JJ} \equiv \begin{pmatrix} R_{jj}(-1), & R_{jj}(-2), & \ldots & R_{jj}(-K) \\ R_{jj}(0) & R_{jj}(-1) & \ldots & R_{jj}(1-K) \\ \vdots & \vdots & \ddots & \vdots \\ R_{jj}(K-2) & R_{jj}(K-3) & \ldots & R_{jj}(-1) \end{pmatrix}$$

$$D \equiv (D^H(1), D^H(2), \ldots, D^H(K))^H.$$

Once D(k) is obtained, an estimate for B(k) can be obtained by using the inverse filter to generate u(n), or by exciting the filter with a unit impulse and then obtaining the first K terms of the impulse response. u(n) can also be used directly in the estimation procedure in Equation 46.

4. Use B(k) (or D(k)) to generate whitened u(k) to start the main algorithm.

In certain embodiment, only the bootstrap method is used to model the interference process and to train the FIR filter responses H(k). For the frequency domain modeling $B(f) = -D^{-1}(f)$.

Multiple Transmit Antennas

A channel estimation procedure according to certain aspects of the invention can be extended to handle the case where the emitters have multiple antennas. One receiver model can be extended such that:

$$x(n) = \sum_{m=1}^{M} \sum_{j=1}^{J} h_{jm}(n) * s_{jm}(n) + i(n),$$

where $h_{jm}(n)$ is the channel seen from the m'th transmit antenna and the j'th emitter and $s_{jm}(n)$ is the complex information symbol transmitted from emitter j out of antenna m at time sample n. It becomes apparent that the m and j indices play the same role as the j indices played in the prior analysis. A simple Cartesian product mapping (j,m)→j' to a new set of indices j' yields the equation:

$$x(n) = \sum_{j'=1}^{J'} h_{j'}(n) * s_{j'}(n) + i(n).$$

Since this is essentially the same framework as provided in the previous analysis, all of the previous results of the previous framework can apply. If knowledge of the full channel matrices is required, then this approach puts a stronger limit on how many emitters can be processed, due to both computational constraints and due to array loading constraints, depending on the number of samples or time bandwidth product (TBP) collected.

In most cases of interest, it can be assumed that a fixed set of transmit weights will be used at each transmitter and channel estimates can be performed by treating those weights as though they were part of the channel. This then provides a starting point of the analysis in Equation 42.

Data Covariance Approach

In certain embodiments, the received data process may be modeled directly as a colored Gaussian noise process without attempting to estimate the interference noise process. This approach may provide the advantage in that it does not require coupling the estimation of the interference process to the estimation of the individual channels from each emitter. The received data vector may be modeled directly in the same way that the interference is modeled, using either the MA model:

$$x(n) = \sum_{k=0}^{K} B_x(k) u_x(n-k) \qquad \text{(eq. 49)}$$

or the easier to estimate AR model:

$$-\sum_{k=0}^{K} D_x(k) x(n-k) = u_x(n),$$

where $D_x(0) = -I$. As in the interference case, the AR mode coefficients can be solved directly from the Yule Walker equations:

$$R_{xx}(q) = \sum_{k=1}^{K} R_{xx}(q-k) D(k),$$

where $$R_{xx}(q) \equiv \langle x(n+q) x(n)^H \rangle_n. \qquad \text{(eq. 50)}$$

In matrix form:

$$r_X = R_{XX} D$$

$$R_{XX}^{-1} r_X = D, \qquad \text{(eq. 51)}$$

where $$r_X \equiv (R_{xx}^H(0), R_{xx}^H(1), \ldots, R_{xx}^H(K))^H$$

$$R_{XX} \equiv \begin{pmatrix} R_{xx}(-1) & R_{xx}(-2) & \ldots & R_{xx}(-K) \\ R_{xx}(0) & R_{xx}(-1) & \ldots & R_{xx}(1-K) \\ \vdots & \vdots & \ddots & \vdots \\ R_{xx}(K-2) & R_{xx}(K-3) & \ldots & R_{xx}(-1) \end{pmatrix}$$

$$D \equiv (D^H(1), D^H(2), \ldots, D^H(K))^H.$$

Once the data process is estimated in the time domain, the frequency domain version can be obtained by noting the following relationships:

$$D(f) x(f) = -u_k(f)$$

$$R_{xx}(f) = N D(f)^{-1} R_{u_x u_x} D(f)^{-H}$$

$$R_{xx}^{-1}(f) = \frac{1}{N} D^H(f) R_{u_x u_x}^{-1} D(f), \qquad \text{(eq. 52)}$$

where $R_{u_x u_x}$ is the spatial covariance matrix of the $u_x(n)$ process, which can be easily estimated using sample averages at the output of the estimated filter D(k). This result is particularly appealing because it demonstrates that the inverse covariance matrix can be obtained for all frequency bins using only one inverse of $R_{u_x u_x}$.

This approach can be further extended by applying the same process to bandlimited signals at the output of a band pass filter. Thus independent sets of signals can be considered at the output of multiple band pass filters. If there are K band pass filters then there would be needed only K matrix inversions of $R_{u_x u_x}(k)$, the covariance matrix of the whitened noise process associated with sub-band k.

Figure 14:
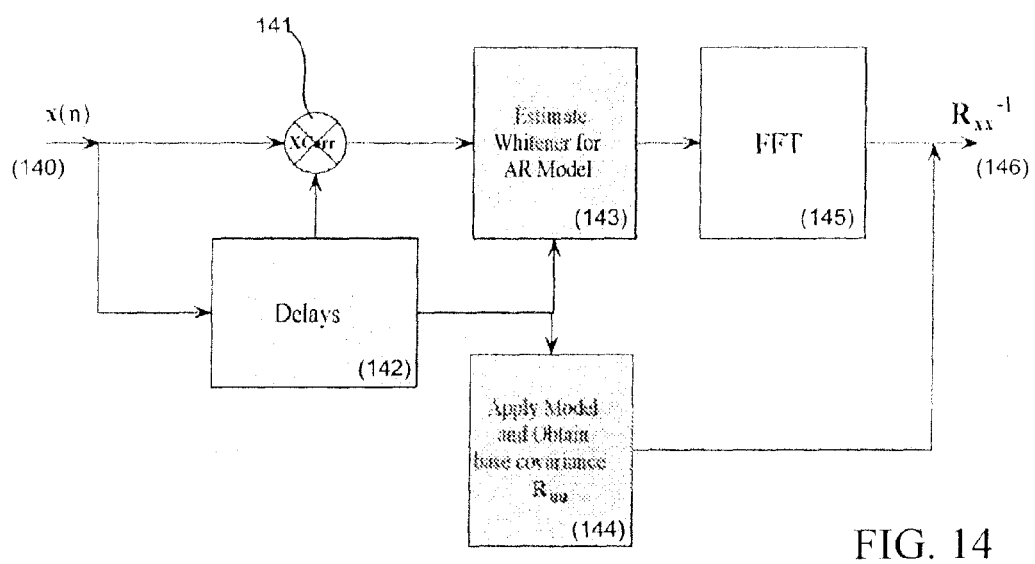
FIG. 14 shows an inverse data autoregressive (AR) whitener estimation process.

A data AR model estimator is illustrated in FIG. 14. Delayed versions 142 of the received data vectors 140 are cross correlated 141 against the received data 140 in order to set up the Yule Walker equations. Those equations may be solved for the whitening model 143 which must be applied to the original data to determine $R_{u_x u_x}$. The inverse data covariance matrix is obtained in the frequency domain after an FFT 145 is performed on the whitening matrix coefficients. The inverse covariance matrix can then be used to obtain the beam-forming weights at the receiver.

Non Causal Filters

In certain embodiments, the implementation of a "localized" non-causal model for the temporal filters is of interest because of the use of a cyclic prefix in most OFDM waveforms. The cyclic prefix can create channels that appear to have non-causal impulse responses. Indeed a bandlimited unit impulse will have energy at negative time values prior to transmission, once the cyclic prefix is added. The received data model can be examined and extended to handle this situation. Thus, from Equation 49:

$$x(n) = \sum_{k=-K_1}^{K_2} B_x(k)u_x(n-k)$$

$$-\sum_{k=K_1}^{K_2} D_x(k)x(n-k) = u_x(n),$$

$$x(n) - \sum_{k\neq 0} D_x(k)x(n-k) = u_x(n)$$

where $D_x(0)=-I$. Minimizing the variance of $u_x(n)$, and using Equation 50, the Yule Walker equations are:

$$R_{xx}(q) = \sum_{\substack{k=-K_1 \\ k\neq 0}}^{K_2} D_x(k)R_{xx}(q-k). \quad \text{(eq. 53)}$$

It is apparent then, that these relations hold independent of the $u_x(n)$ spatial coloring or non identity value of $R_{u_x u_x}(k)$. Defining:

$$r_X \equiv (R_{xx}^H(-K_1), R_{xx}^H(1-K_1), \ldots R_{xx}^H(K_2))^H$$

$$R_{XX} \equiv \begin{pmatrix} R_{xx}(0), & R_{xx}(-1), & \ldots & R_{xx}(-K_1-K_2) \\ R_{xx}(1) & R_{xx}(0) & \ldots & R_{xx}(1-K_1-K_2) \\ \vdots & \vdots & \ddots & \vdots \\ R_{xx}(K_1+K_2) & R_{xx}(K_1+K_2-1) & \ldots & R_{xx}(0) \end{pmatrix}$$

$$D \equiv (D^T(-K_1), D^T(1-K_1), \ldots, D^T(-1), D^T(1), \ldots, D^T(K_2))^T.$$

It will be appreciated that the entries corresponding to the zero index are omitted. The equations can then be solved from Equation 51. A similar extension to the direct estimation of non-causal channel responses can be employed. Adopting the multi-user non-causal channel model from Equation 42:

$$i(n) = x(n) - \sum_{k=-K_1}^{K_2} H(k)s(n-k),$$

the Yule-Walker equations can then be written as:

$$R_{xs}(k) = \sum_{m=-K_1}^{K_2} H(m)R_{ss}(k-m) \quad \text{(eq. 54)}$$

$$H \equiv (H(-K_1), H(1-K_1), \ldots H(K_2))$$

$$R_{xS} \equiv (R_{xs}(-K_1), R_{xs}(1-K_1), \ldots R_{xs}(K_2))$$

$$R_{SS} \equiv \begin{pmatrix} R_{ss}(0) & R_{ss}(1) & \ldots & R_{ss}(K_1+K_2) \\ R_{ss}(-1) & R_{ss}(0) & \ldots & R_{ss}(K_1+K_2-1) \\ \vdots & \vdots & \ldots & \vdots \\ R_{ss}(-K_1-K_2) & R_{ss}(-K_1-K_2+1) & \ldots & R_{ss}(0) \end{pmatrix}.$$

The equations are solved by $H=R_{xS}R_{SS}^{-1}$.

Frequency Domain Versions

In certain embodiments, the Yule Walker Equations can be solved in the frequency domain by noting that a convolution is just a multiply in the frequency domain. However, FFTs of different sizes and/or decimation may be required because the cross correlations and the convolutions with the channels can have different time support. For example, by taking the DFT of both sides of Equation 54:

$$\hat{R}_{xs}(e^{j\omega}) = \hat{H}(e^{j\omega})\hat{R}_{ss}(e^{j\omega}),$$

(eq. 55)

where the $\hat{\bullet}$ notation is used to indicate the transform. In this example, it is assumed that a truncated transform for $\hat{H}(e^{j\omega}) = \sum_{k=-K_1}^{K_2} H(k)e^{-jk\omega}$, as though the support for $H(k)$ was confined to $[-K_1, K_2]$. Using the Discrete Fourier Transform yields:

$$\hat{R}_{xs}(e^{j\omega}) = \hat{X}(e^{j\omega})\hat{s}^H(e^{j\omega})$$

$$\hat{R}_{ss}(e^{j\omega}) = \hat{s}(e^{j\omega})\hat{s}^H(e^{j\omega})$$

$$\hat{X}(e^{j\omega}) = \hat{H}(e^{j\omega})\hat{s}(e^{j\omega}). \quad \text{(eq. 56)}$$

The latter equation is undetermined unless constraints are put on $\hat{H}(e^{j\omega})$, (e.g. finite time support). The easiest way to handle a finite time support constraint in the frequency domain is to solve Equation 55 in the frequency domain using a DFT of length $K_1+K_2+1$. Then:

$$\hat{H}(e^{j\omega}) = \hat{R}_{ss}(e^{j\omega})\hat{R}_{ss}^{-1}(e^{j\omega})$$

can be set for $\omega=2\pi q/N$, $q=-K_1 \ldots K_2$. This is computationally cheaper than solving Equation 54 directly in the time domain. The simplifications in Equation 56 typically cannot be applied here because the DFT is truncated. It is also possible to use FFT techniques to solve the received data modeling problem by taking the DFT of both sides of Equation 53.

Precomputations and Single Emitter Analysis

In certain embodiments, certain computations related to the computation of $H(k)$ can be computed in advance of any received data and stored in memory. To further simplify the analysis the assumption of computing the channel for a single emitter can be considered, because this assumption is likely to be sufficient to obtain a near optimal linear beam-former. The latter assertion arises from the fact that this is true in the absence of multipath. The joint steering vector estimate is not needed to obtain optimal beam-forming weights.

Assuming a single emitter, then the cross correlation statistic may be written:

$$R_{xs}(k) \equiv \langle x(n)s^H(n-k)\rangle_n \quad \text{(eq. 57)}$$

$$= \frac{1}{N} XD^k s,$$

where X is the M×N received (non-conjugated) data matrix. The n'th column of X is the data vector over M antennas received at time sample n. $D^k$ is the circular shift operator corresponding to a delay or right shift of k samples and s is the N×1 conjugated training signal whose n'th element is $s^*(n)$. Defining $$S \equiv [D^{-K_1}s, D^{1-K_1}s, \ldots, s, D^1s, D^2s, \ldots D^{K_2}s],$$

the channel estimator becomes:

$$H=XS(S^HS)^{-1}.$$

Typically, the matrix $S(S^H S)^{-1}$ can be precomputed. A straightforward extension to the multiple user case can also be made and the channel estimating matrix may also be precomputed in that case.

Waveform Design

Certain embodiments address a number of design parameters when determining what training waveforms should be used to obtain channel estimates. Parameters that are addressed include constraints imposed by standards such as WiMAX, and the efficiency of the estimation procedure. In one embodiment, design criteria include
1. reducing the peak to average power ratio (PAPR) of the transmitted waveform,
2. enforcing minimal correlation between training sequences from different emitters,
3. enforcing minimal correlation between the training sequence and delayed or lagged versions of the training sequence,
4. enforcing minimal correlation between the training sequence and delayed versions of other training sequences,
5. enabling fast transform techniques so that many cross correlations can be performed simultaneously (e.g. Hadamard sequences),
6. restricting training sequences to the subbands that are being used by the emitter, and
7. enforcing stacked carrier spreading so that the training sequences have the same frequency spreading code as their bearer traffic waveforms.

In certain circumstances, some of these criteria and goals may conflict with other criteria and goals. In certain embodiments, criteria are weighted according to the design priorities of the system. Each goal may offer a mathematical and in some cases linear constraint and may be associated with a mathematical objective function. The constraints and objectives can be summed together with an appropriate weighting. Thus the design of these waveforms can be obtained using parameter optimization. One approach for doing this is to deploy stochastic global parameter optimization techniques.

Time Domain Preamble Symbol Design

Certain embodiments provide systems compliant with promulgated standards. In one example, consistent with requirements of the WiMAX standard, one possible time domain preamble symbol 150 comprises a pseudo-noise (PN) sequence having a length of 512 as illustrated in FIG. 15. To support downlink messaging, each base station (BS) uses a unique PN sequence. In order to avoid the "out-band" interference, the "chip" rate of the PN sequence should be less than 768. In the example, 576 chips are used during 0.1028 ms, where the first 64 chips 151 correspond to the cyclic prefix period 153 and the following 512 chips 154 correspond to the OFDM symbol 155. The first 64 chips are determined by the cyclic prefix.

Synchronization Procedure with Time Domain Preamble

Certain embodiments provide a mobile station (MS) that stores a sufficient number of PN sequences to cover those used by interfering base stations. Each BS can use a unique PN sequence. Initially, the MS searches for the strongest PN sequence in order to obtain frame timing information. When the MS obtains the frame timing information and decodes control channel information successfully, the MS can setup a connection with this BS. During the initial synchronization search, the MS can not only search the strongest PN sequence, but also can search the second "strongest" and third "strongest" paths. After the connection between the MS and BS has been established, the BS may provide the PN sequences used by the neighboring cells to the MS. The number of PN sequences, the PN generator and the neighboring cell messages are typically chosen according to the network geometry and by the criterion suggested earlier.

Channel Interpolation and Extrapolation in Time Varying Channels

Certain embodiments extend the technique to handle time varying channels by proposing various schemes that permit the interpolation of the channel from one time block to the next. This is readily accomplished by further parameterizing the channel matrices, $R_{uu}$, B(k), H(k) and D(k) by a continuous time offset t. It can be assumed that the channel is sampled at discrete times $t_q$. The channel is assumed to be quasi-stationary during the training burst at time $t_q$. Possible interpolation/extrapolation schemes include
1. linear interpolation,
2. log linear interpolation (linear interpolate the logarithm of the channel quantities),
3. polynomial and log polynomial interpolation, and
4. Spline and log spline interpolation.

Certain embodiments use model based interpolation, moving specular reflectors and their known effects on the channel are modeled. Each of these types of interpolation and extrapolation can also be performed as needed in the frequency domain.

Simplifications and Additional Embodiments

Certain embodiments employ one or more simplifications of the techniques described above. Some simplifications allow a reduction in hardware complexity. Also channel models used as downlink channels can be deployed for use in uplink applications. In one example, time division duplex systems (TDD) can exploit channel reciprocity including the use of receiver weights as transmit weights. Thus knowledge of the channel as a function of frequency can greatly facilitate linear beam-forming/stacked carrier spreading at both ends of the link. Uplink processing may proceed using the same basic signal processing structure.

Many simplifications can be considered in the area of reducing the complexity of channel estimation. In certain embodiments, it may be assumed that $R_{su}(k)=0$, so that the estimation of the individual channels, H(k), and the estimation of the interference statistics B(k) or D(k) would decouple. Further simplifications along these lines assume that the training signals $s_j(n)$ are orthonormal or even that they are white, that is orthogonal to shifts, $s_j(n-k) \perp s_q(n)$. This would completely diagonalize $R_{ss}$ in Equation 48 making the solution of the Yule Walker equations trivial, requiring only cross correlations with $s_j(n-k)$.

In certain embodiments, Hadamard codes can be used for $s_q(n)$, making the correlation over multiple emitters (q), much more rapid, whilst maintaining orthogonality. In certain embodiments, fast convolution algorithms may be employed to quickly obtain the correlations over multiple lags. To further simplify processing, certain embodiments also attempt to learn the channels of all the nearby emitters and then treat the interference process as white noise, thereby eliminating the need for certain estimations.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

With reference to FIGS. 7, 8, 12 and 19, certain embodiments of the invention provide methods and systems for enhancing interference cancellation. In some of these embodiments the methods comprise receiving a signal 1900 including stacked carriers 80 at a receiver 121, obtaining, at 1908, samples 82 from two or more of the stacked carriers 80, creating a data vector from the samples 1910, wherein the two or more stacked carriers are selected using a steering vector received during a synchronization 1901 of the receiver. In some of these embodiments, spacing between the stacked carriers is variable. In some of these embodiments, the steering vector is calculated to obtain cancellation of interference from another receiver. In some of these embodiments, the steering vector is calculated based on a time domain channel estimation. Some of these embodiments obtain frequency domain interference cancellation.

Certain embodiments of the invention provide specialized time domain training sequences 1901 for use in channel estimation at 1902 adhering to one or more design criterion. In some of these embodiments, global stochastic parameter estimation techniques are used to facilitate the design of the training sequences. In some of these embodiments, time domain training sequences that perform simple cross correlation are used to obtain a channel estimate for use in stacked carrier beamforming and/or for use in OFDM based spatial beamforming at 1906.

Certain embodiments of the invention provide systems and methods that use time domain training sequences to solve Yule Walker equations. In some of these embodiments, estimation of the interference noise process is provided. In some of these embodiments, bootstrapping techniques enable a first attempt to estimate the interference process and remove it from the environment, prior to solving the joint Yule Walker equations. In some of these embodiments, direct data process estimation is used including an inverse and/or an AR model.

In some of these embodiments, at least one of fast convolution and FFT techniques facilitate an economical solution of the Yule Walker equations and/or multiple cross correlations. In some of these embodiments, data process AR model facilitate direct computation of an inverse covariance matrix, in the frequency domain over some or many subcarriers, without having to perform additional matrix inversions. In some of these embodiments, an inverse interference process AR model is used to directly compute the inverse interference covariance matrix, in the frequency domain over one or more subcarriers, without having to perform additional matrix inversions.

In some of these embodiments, one or more of a data process and an interference process AR model is used to directly compute inverse covariance matrices for facilitating computation of beamforming weights for a plurality of subcarriers to reduce the effects of frequency dispersion. In some of these embodiments, Multiple User Detection is used to further enhance receiver performance. In some of these embodiments, non-causal filters and non-causal filter estimation is used to support a cyclic prefix. In some of these embodiments, the cycle prefix is used in an OFDM system. In some of these embodiments, precomputation is used to obtain the inverses of multiple signal cross and auto correlations to facilitate solution of Yule-Walker equations.

Certain embodiments of the invention provide systems and methods for interpolating or extrapolating matrix channel estimates and whitening matrix filter estimates over time and frequency. Some of these embodiments include the use of one or more of linear interpolation, log linear interpolation, linear interpolation of the logarithm of channel quantities, polynomial interpolation, log polynomial interpolation, spline interpolation and log spline interpolation. In some of these embodiments, interpolation and extrapolation is used for maintaining linear beamforming weights as a function of time or frequency.

Certain embodiments of the invention provide systems and methods that use state space or filter based modeled interpolators in the frequency domain or time domain to interpolation of the channels, or whitening matrix-filters over time or frequency, for maintaining linear beamforming weights as a function of time or frequency. In some of these embodiments, a linear weight computation procedure models all important emitter channels, and treats unmodeled interference as white noise. In some of these embodiments, a linear weight computation procedure models one or more important emitter channels, and models either the interference process or the entire data process using inverse modeling or even direct modeling using standard system identification procedures. In some of these embodiments, a deinterleaver is used for facilitating the use of stacked carrier processing by forming vectors in stacks and clustering vectors that are adjacent in frequency. In some of these embodiments, the system is an IEEE 802.16 compliant system. In some of these embodiments, the system uses subcarrier permutations in repetition codes.

Certain embodiments of the invention provide systems and methods of interference cancellation comprising a stacked carrier for enhancing interference cancellation for a set of repetition codes spread over frequency subcarriers in an arbitrary manner. Some of these embodiments further comprise identification of interfering spread waveforms that have at least two carriers that overlap. In some of these embodiments, non-overlapping subcarriers are treated as zeros in the measured steering vectors. In some of these embodiments, a stacked carrier is used to enhance interference cancellation for large spreading factor and for exploiting sparse channels to effect a matrix inverse when computing linear beamforming/despreading weights. In some of these embodiments, backsubstitution is used to simplify processing wherein data is ordered such that the in-cell data is at the bottom of the vector.

In some of these embodiments, space time adaptive processing (STAP) is used to faciliate beamforming of communications signals for OFDM waveforms. In some of these embodiments, a processing chain is provided for estimating communication signals, comprising a collection of first and second order statistics, using a matrix fast filter estimation, using a bank of bandpass filters to support stacked carrier, and using FFTs to improve computational complexity to facilitate beamforming in the frequency domain for OFDM waveforms. In some of these embodiments, non causal filters provide fast matrix valued adaptive space time processing for interference cancellation in OFDM and 802.16 (WiMax) systems.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for enhancing interference cancellation, comprising:
   receiving a signal including stacked carriers at a receiver;
   obtaining samples from two or more of the stacked carriers;
   creating a data vector from the samples, wherein the two or more stacked carriers are selected using a steering vector received during a synchronization of the receiver;

wherein the steering vector is calculated based on a time domain channel estimate, and wherein the steering vector enables frequency domain interference cancellation.

2. The method of claim 1, wherein spacing between the stacked carriers is variable.

3. The method of claim 1, wherein the steering vector is calculated to obtain cancellation of co-channel interference in the signal.

4. The method of claim 1, further comprising obtaining the time domain channel estimate using Yule Walker equations, wherein one or more time domain training sequences are used to solve the Yule Walker equations.

5. The method of claim 1, further comprising
obtaining the time domain channel estimate based on one or more predefined time domain training sequences; and
using the channel estimate for stacked carrier beamforming.

6. The method of claim 1, further comprising
obtaining the time domain channel estimate based on one or more predefined time domain training sequences; and
using the channel estimate for orthogonal frequency-division multiplexing (OFDM) based spatial beamforming.

7. The method of claim 4, further comprising removing estimated interference prior to solving the Yule Walker equations.

8. The method of claim 7, wherein the Yule Walker equations are solved using at least one of fast convolution and a Fast Fourier Transform.

9. The method of claim 5, wherein the stacked carrier beamforming is obtained by computing beamforming weights for a plurality of subcarriers using one or more of a data process and an interference process autoregressive model, wherein the computing step reduces the effects of frequency dispersion.

10. The method of claim 1, further comprising performing depermutation on a number of code repetitions in the received signal for the time domain channel estimate.

11. An interference cancellation system, comprising:
a receiver including:
at least one antenna configured to receive a signal that includes stacked carriers, wherein the receiver is configured to create a data vector from samples obtained from two or more of the stacked carriers selected using a steering vector received during synchronization of the receiver,
wherein the steering vector is calculated based on a time domain channel estimate, and wherein the steering vector enables frequency domain interference cancellation.

12. The system of claim 11, wherein the steering vector is selected to enable cancellation of co-channel interference in the signal.

13. The system of claim 11, wherein the antenna receives the signal from a first emitter, and wherein the steering vector is selected to enable cancellation of interference received from a second emitter.

14. The system of claim 13, wherein the receiver is coupled to a plurality of antennas.

15. The system of claim 11, further comprising a Fast Fourier Transform processor configured to obtain the channel estimate by solving Yule Walker equations.

16. The system of claim 11, wherein the receiver generates the channel estimate based on one or more predefined time domain training sequences and uses the channel estimate for beamforming.

17. The system of claim 11, wherein the channel estimate is used for spatial beamforming.

18. The system of claim 15, wherein one or more time domain training sequences are used to remove estimated interference prior to solving the Yule Walker equations.

19. The system of claim 11, wherein the receiver is configured to extract a set of subcarriers from the signal.

20. The system of claim 19, wherein the subcarriers are selected from an arbitrary set of frequency bins.

21. A method for enhancing interference cancellation, comprising:
receiving a signal including stacked carriers at a receiver;
obtaining samples from two or more of the stacked carriers, wherein the two or more stacked carriers are selected using a steering vector received during a synchronization of the receiver;
creating a data vector from the samples; and
obtaining a time domain channel estimate using Yule Walker equations, wherein one or more time domain training sequences are used to solve the Yule Walker equations, and wherein the steering vector is calculated based on the time domain channel estimate.

22. The method of claim 21, further comprising removing estimated interference prior to solving the Yule Walker equations.

23. The method of claim 22, wherein the Yule Walker equations are solved using a fast convolution or a Fast Fourier Transform.

24. The method of claim 21, wherein the steering vector is calculated based on a time domain channel estimate, and wherein the steering vector enables cancellation of co-channel interference in the signal.

25. The method of claim 24, further comprising
obtaining the time domain channel estimate based on one or more predefined time domain training sequences; and
using the channel estimate for stacked carrier beamforming.

26. An interference cancellation system, comprising
a receiver including:
at least one antenna configured to receive a signal that includes stacked carriers, wherein the receiver is configured to create a data vector from samples obtained from two or more of the stacked carriers selected using a steering vector received during synchronization of the receiver; and
a Fast Fourier Transform processor configured to obtain a channel estimate by solving Yule Walker equations;
wherein the steering vector is calculated based on the channel estimate.

27. The system of claim 26, wherein one or more time domain training sequences are used to remove estimated interference prior to solving the Yule Walker equations.

28. The system of claim 26, wherein the steering vector is selected to enable cancellation of co-channel interference in the signal.

29. The system of claim 26, wherein the steering vector is calculated based on a time domain channel estimate, and wherein the steering vector enables frequency domain interference cancellation.

30. The system of claim 26, wherein the receiver generates the channel estimate based on one or more predefined time domain training sequences and uses the channel estimate for beamforming.

* * * * *